US008323089B2

(12) United States Patent
Nagano

(10) Patent No.: US 8,323,089 B2
(45) Date of Patent: Dec. 4, 2012

(54) GAMING SYSTEM HAVING LARGE DISPLAY AND PLURAL GAMING MACHINES

(75) Inventor: Hiroyuki Nagano, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1161 days.

(21) Appl. No.: 12/183,408

(22) Filed: Jul. 31, 2008

(65) Prior Publication Data

US 2009/0253486 A1 Oct. 8, 2009

Related U.S. Application Data

(60) Provisional application No. 61/042,074, filed on Apr. 3, 2008.

(51) Int. Cl.
*A63F 13/00* (2006.01)

(52) U.S. Cl. ................. 463/20; 463/31; 463/42; 463/46

(58) Field of Classification Search .............. 463/16–21, 463/46, 31, 42
See application file for complete search history.

(56) References Cited

U.S. PATENT DOCUMENTS

| | | | | |
|---|---|---|---|---|
| 3,940,136 | A * | 2/1976 | Runte | 463/3 |
| 5,292,131 | A * | 3/1994 | Takemoto et al. | 273/148 R |
| 6,068,553 | A | 5/2000 | Parker | |
| 6,210,275 | B1 | 4/2001 | Olsen | |
| 6,224,484 | B1 | 5/2001 | Okuda et al. | |
| 7,833,102 | B2 * | 11/2010 | Beadell et al. | 463/46 |
| 7,892,098 | B2 * | 2/2011 | Nguyen et al. | 463/46 |
| 2005/0079911 | A1 | 4/2005 | Nakatsu | |
| 2005/0119044 | A1 | 6/2005 | Lim et al. | |
| 2005/0187014 | A1 | 8/2005 | Saffari et al. | |
| 2005/0215325 | A1 * | 9/2005 | Nguyen et al. | 463/46 |
| 2006/0073897 | A1 | 4/2006 | Englman et al. | |
| 2006/0205468 | A1 | 9/2006 | Saffari et al. | |
| 2008/0113818 | A1 * | 5/2008 | Beadell et al. | 463/46 |
| 2008/0113821 | A1 * | 5/2008 | Beadell et al. | 463/46 |

* cited by examiner

*Primary Examiner* — Ronald Laneau
*Assistant Examiner* — Ross Williams
(74) *Attorney, Agent, or Firm* — Lesyoume IP Meister, PLLC.

(57) ABSTRACT

The gaming system of the present invention comprises: a common image display having a common-image-display cabinet provided with an opening over substantially the entire front surface thereof, and a common flat display panel portion that is provided in the opening, and allowing the common flat display panel portion to rotate upwardly and downwardly with respect to the floor surface with a hinge as a shaft by having an upper end of the common flat display panel portion mounted on an upper end of a front surface of the common-image-display cabinet via the hinge.

4 Claims, 33 Drawing Sheets

Fig. 10

| | First column | Second column | Third column | Fourth column | Fifth column |
|---|---|---|---|---|---|
| Code No. | Symbol | Symbol | Symbol | Symbol | Symbol |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

Fig. 19

| Symbol | Number of displayed symbols | | | |
|---|---|---|---|---|
| | 3 | 4 | 5 | 6 or more |
| CHERRY | 2 | 4 | 6 | m*(n−2) |
| BELL | 4 | 8 | 12 | |
| STRAWBERRY | 6 | 12 | 18 | |
| ORANGE | 8 | 16 | 24 | |
| PLUM | 10 | 20 | 30 | |
| BLUE 7 | 20 | 40 | 60 | |
| JACKPOT 7 | 40 | 80 | 120 | |
| APPLE | 50 | 100 | 200 | m*(n−2) |

※1 "m" represents number of payouts of the case where 3 symbols are displayed
"n" is number of displayed symbols ※2 When 5 or more symbols of "APPLE" are displayed, free games in predetermined number are conducted in addition to payouts

GAMING SYSTEM HAVING LARGE DISPLAY AND PLURAL GAMING MACHINES

CROSS-REFERENCE TO RELATED APPLICATIONS

This application claims benefit of priority based on U.S. Provisional Patent Application No. 61/042,074 filed on Apr. 3, 2008. The contents of this application are incorporated herein by reference in their entirety.

BACKGROUND OF THE INVENTION

1. Field of the Invention

The present invention relates to a gaming system having a large display and plural gaming machines.

2. Discussion of the Background

Conventionally, there exists a gaming system in which a plurality of gaming machines are linked to a control device by network, as disclosed in: U.S. Pat. No. 6,068,553, U.S. Pat. No. 6,210,275, U.S. Pat. No. 6,224,484, US 2005/0079911-A1, US 2005/0119044-A1, US 2006/0205468-A1, US 2005/0187014-A1, and US 2006/0073897-A1. In such gaming systems, a control device pools part of game media which have been inserted in respective gaming machines, and pays out the pooled game media to gaming machines in which winning of progressive jackpots has occurred. Among these gaming systems, there are gaming systems adapted to display the amount of pooled game media to a common display.

In cases where such gaming systems are installed in casino halls and the like, there is a need for connection of a plurality of gaming machines to a control device through a network, installation of a display on a wall, works for preventing the network wirings from being exposed to cause disfigurement, and the like. Further, there has been a problem as seen in the case that once gaming systems have been constructed, there arises a need for works every time the position of the display is required to be changed due to change of the layout.

Further, since the position of the display is limited to places where a device for securing the display can be provided, the installation places of the gaming system are restricted in cases where the display is to be provided on a wall. Further, in cases where the display is to be hanged from a ceiling, it is dangerous when the ceiling is high. As described above, there have been restrictions on the places at which gaming systems are installed.

Further, in cases where the display is provided on a wall, there has been a possibility of changes of the wall color due to heat generation from the display.

In order to overcome the aforementioned problems, making a plurality of gaming machines, a common display and a control device form a single module has been conceived. However, in performing maintenance of the common display, it is necessary to perform maintenance of the common display at the back-surface side at which a control board for the display and the like are provided. Therefore, even when the gaming system is constituted by a single module, in a case where a wall or other gaming machines exist around the back surface of the installed gaming system, there arises a need for moving the gaming system itself or moving other gaming machines installed around the back surface of the gaming system, in performing maintenance of the common display. As described above, even when the gaming system is constituted by a single module, there has been induced a new problem of having difficulty in performing maintenance of the common display, depending on the place at which the gaming system is installed.

The present invention is made in view of the aforementioned problems, and aims at providing a gaming system which makes it possible to easily perform maintenance of a common display.

The contents of U.S. Pat. No. 6,068,553, U.S. Pat. No. 6,210,275, U.S. Pat. No. 6,224,484, US 2005/0079911-A1, US 2005/0119044-A1, US 2006/0205468-A1, US 2005/0187014-A1, and US 2006/0073897-A1 are incorporated herein by reference in their entirety.

SUMMARY OF THE INVENTION

A first aspect of the present invention provides a gaming system having the following configuration.

Namely, the gaming system comprises: a plurality of gaming machines, each including an image display provided with a flat display panel portion therein and an input device for input and being capable of executing an independent game; a control device; a single pedestal including a housing space that houses the control device therein, a bottom surface portion for installing the pedestal on a floor surface, and an installation surface for installing the plurality of gaming machines at positions facing to the bottom surface portion; a supporting member that is provided such that a first end of the supporting member is supported by the pedestal and a second end of the supporting member is oriented upwardly; a common image display having a common-image-display cabinet provided with an opening over substantially the entire front surface thereof, and a common flat display panel portion that is provided in the opening and has a size larger than that of the flat display panel portion, allowing the common flat display panel portion to rotate upwardly and downwardly with respect to the floor surface with a hinge as a shaft by having an upper end of the common flat display panel portion mounted on an upper end of a front surface of the common-image-display cabinet via the hinge, being supported at a position above the upper surfaces of the gaming machines by the second end side of the supporting member, and being controlled by the control device; and communication cables for communication between the plurality of gaming machines and the control device.

According to the gaming system, the plurality of gaming machines, the control device and the common image display constitute a single module. This configuration eliminates the necessity of connection of the plurality of gaming machines to the control device through a network, installation of the common image display on a wall, works for preventing the network wirings from being exposed to cause disfigurement, and the like, and also eliminates the necessity of works in changing the installation and the layout. Further, the gaming system can be installed even at a place having no walls in the vicinity thereof and a place having a high ceiling. This eliminates the restriction on the place at which the gaming system is installed.

Further, since there is no need for installing the common image display on a wall, the change of wall colors due to heat generated from the common image display can be suppressed.

Further, the upper end of the common flat display panel portion is mounted on the upper end of the front surface of the common-image-display cabinet via the hinge and, therefore, the common flat display panel portion can rotate upwardly and downwardly with respect to the floor surface, with the hinge as a shaft. Since the common flat display panel portion can rotate upwardly with respect to the floor surface, it is possible to perform maintenance of the common image display in front of the common image display, thereby facilitating maintenance of the common image display.

Further, the above-mentioned gaming system desirably has the following configuration.

Namely, the common-image-display cabinet comprises a holding bar that is provided rotatably in a forward direction of the common-image-display cabinet, with a first end of the holding bar as the center, in such a way that the holding bar projects forward from the common-image-display cabinet, and the common flat display panel portion is provided, in the back surface thereof, with an engagement depressed portion with which a second end of the holding bar is engaged, so that the common flat display panel portion is held at rest after being rotated upwardly or downwardly with respect to the floor surface with the hinge as a shaft.

According to the gaming system, the common-image-display cabinet includes a holding bar provided rotatably in the forward direction with the first end of the holding bar as the center, in such a way that the holding bar projects forward from the common-image-display cabinet, and the engagement depressed portion provided in the back surface of the common flat display panel portion is engaged with the second end of the holding bar, so that the common flat display panel portion can be held at rest after being rotated upwardly or downwardly with respect to the floor surface with the hinge as a shaft.

Further, the above-mentioned gaming system desirably has the following configuration.

Namely, the control device comprises a processor, and the processor is programmed to execute the processing of (A) executing a normal game in the respective gaming machines connected through the communication cables, (B) determining whether or not to execute a common game which is simultaneously executed in all the gaming machines connected through the communication cables, (C) determining for each of the gaming machines whether or not a normal game in execution has ended, when determining in the processing (B) that a common game is to be executed, (D) canceling, when determining in the processing (C) that the normal game in execution has ended in any of the gaming machines, start of a new normal game in this gaming machine, (E) determining whether or not the normal game in execution has ended in all the gaming machines connected through the communication cables, (F) executing a common game in all the gaming machines connected through the communication cables, when determining in the processing (E) that the normal game in execution has ended in all the gaming machines, and (G) displaying to the common image display a result of the common game executed in the processing (F).

According to the gaming system, normal games are executed in the respective gaming machines connected to the control device through the communication cables and, when it is determined that a common game which is simultaneously executed in all the gaming machines connected through the communication cables is to be executed, start of a new normal game in the respective gaming machines is cancelled. Then, when it is determined that the normal game in execution has ended in all the gaming machines, a common game is executed in all the gaming machines connected through the communication cables.

Since not only a normal game but also a common game, which is simultaneously executed in all the slot machines connected through the communication cables, is executed, it is possible to cause variations in games, thereby reducing the tendency of games to bore players even when games are executed for a long time.

Further, the above-mentioned gaming system desirably has the following configuration.

Namely, each of the gaming machines comprises a controller, and the control device includes a processor, the controller programmed to execute the processing of (a) executing a normal game, the processor programmed to execute the processing of (A) determining whether or not to execute a common game which is simultaneously executed in all the gaming machines connected through the communication cables, and (B) transmitting a game cancel signal to all the gaming machines connected through the communication cables, when determining in the processing (A) that a common game is to be executed, the controller programmed to execute the processing of (b) determining whether or not the game cancel signal has been received from the control device through the communication cable, (c) canceling start of a new normal game, when determining in the processing (b) that the game cancel signal has been received, and (d) transmitting a normal-game-ended signal to the control device through the communication cable, after having executed the processing (c), the processor programmed to execute the processing of (C) determining through the communication cables whether or not the normal-game-ended signal has been received from all the gaming machines connected through the communication cables, (D) executing a common game when determining in the processing (C) that the normal-game-ended signal has been received, and (E) displaying to the common image display a result of the common game executed in the processing (D).

According to the gaming system, when the control device determines to execute a common game which is simultaneously executed in all the gaming machines connected thereto through the communication cables, the control device transmits a game cancel signal to all the gaming machines connected thereto through the communication cables. Upon receipt of the game cancel signal, each gaming machine cancels start of a new normal game and transmits a normal-game-ended signal to the control device. Then, the control device executes a common game, when normal-game-ended signal has been received from all the gaming machines.

Since not only a normal game but also a common game, which is simultaneously executed in all the gaming machines connected through the communication cables, is executed, it is possible to cause variations in games, thereby reducing the tendency of games to bore players even when games are executed for a long time.

Further, normal games are executed by the respective gaming machines, which can reduce the load on the processor included in the control device.

Figure 8:
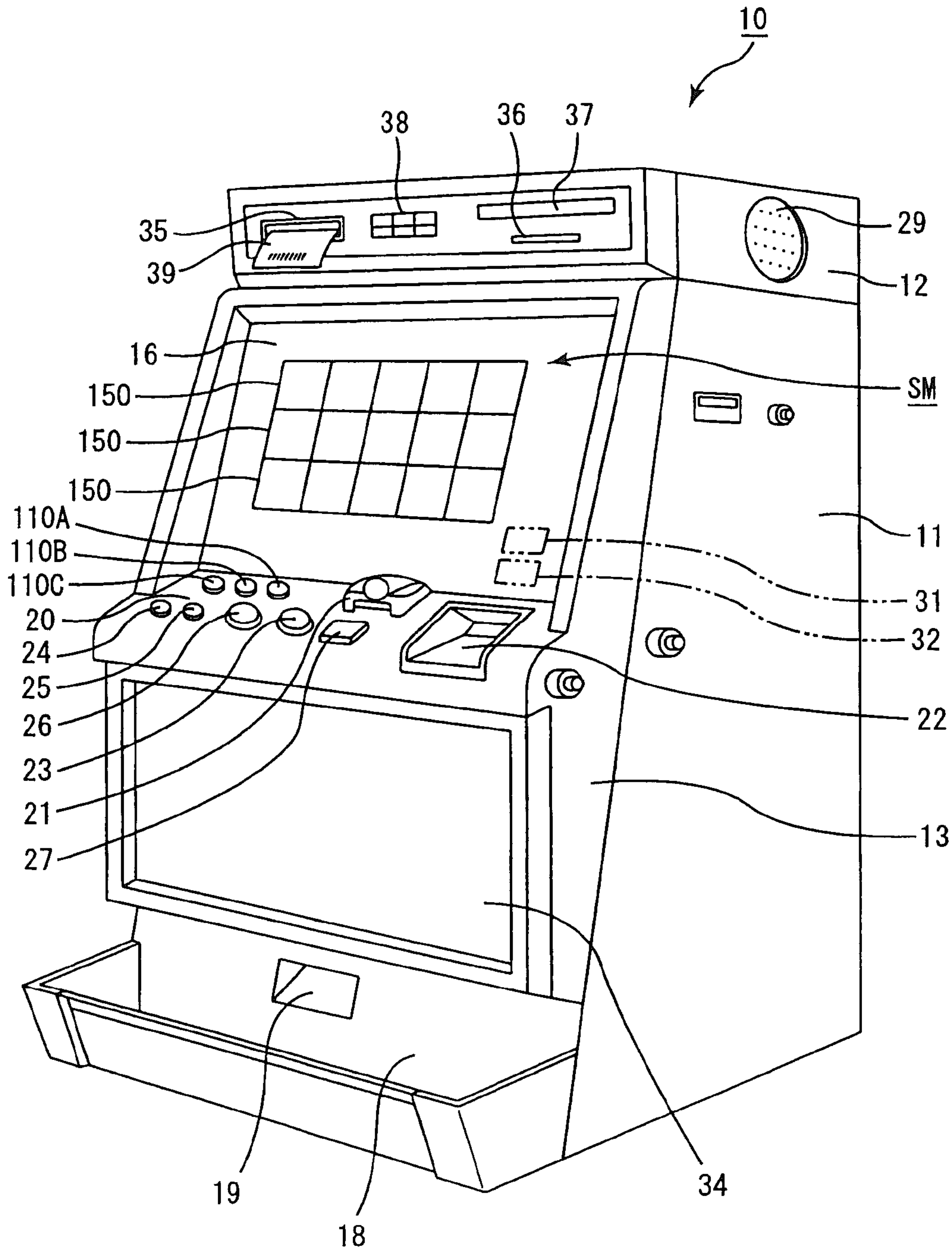

in the secondary supporting member illustrated in FIG. 8.

FIG. 8 is a perspective view schematically showing the slot machine according to an embodiment of the present invention.

Figure 9:
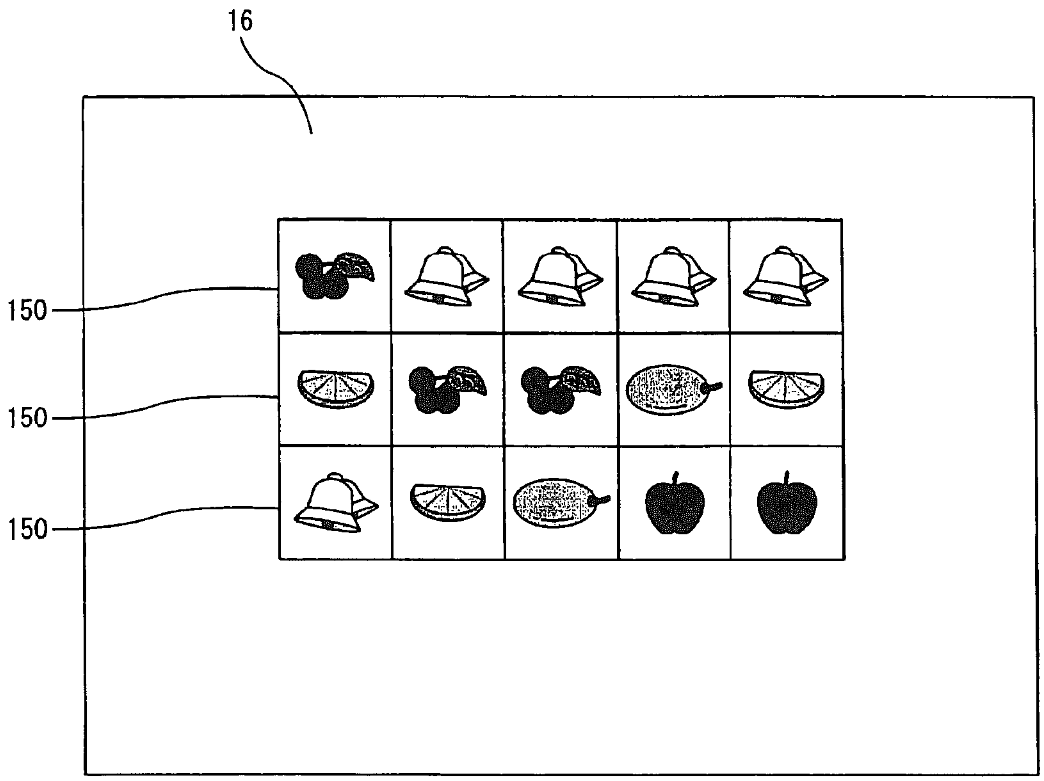

FIG. 9 is a view illustrating an exemplary image displayed to the lower image display panel.

FIG. 10 is a view illustrating symbols which are displayed in respective display blocks, and the code Nos. of the respective symbols.

Figure 7:
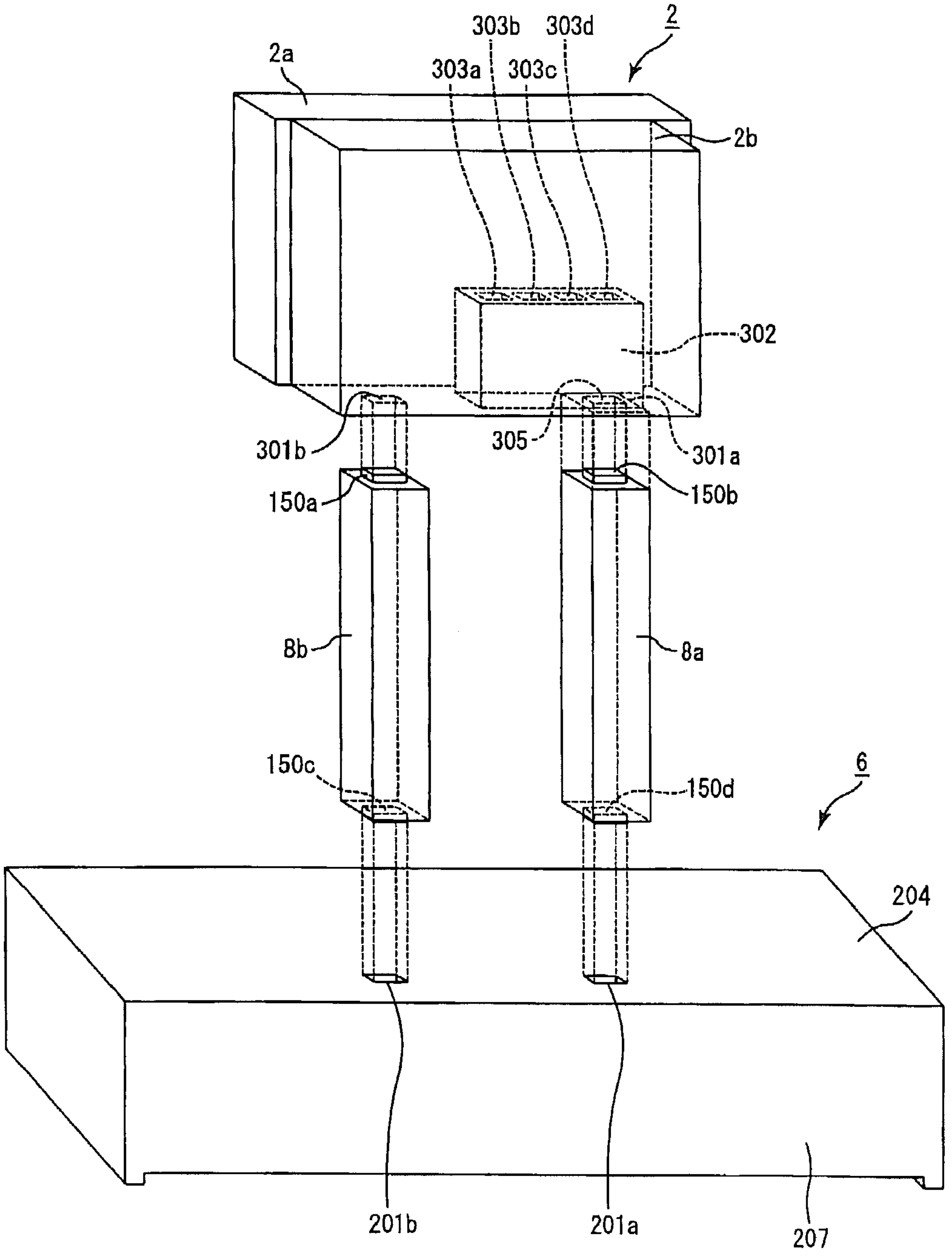
FIG. 7 is a perspective view schematically illustrating a state where the common image display, the supporting members and the pedestal according to an embodiment are being coupled to one another.
Figure 11:
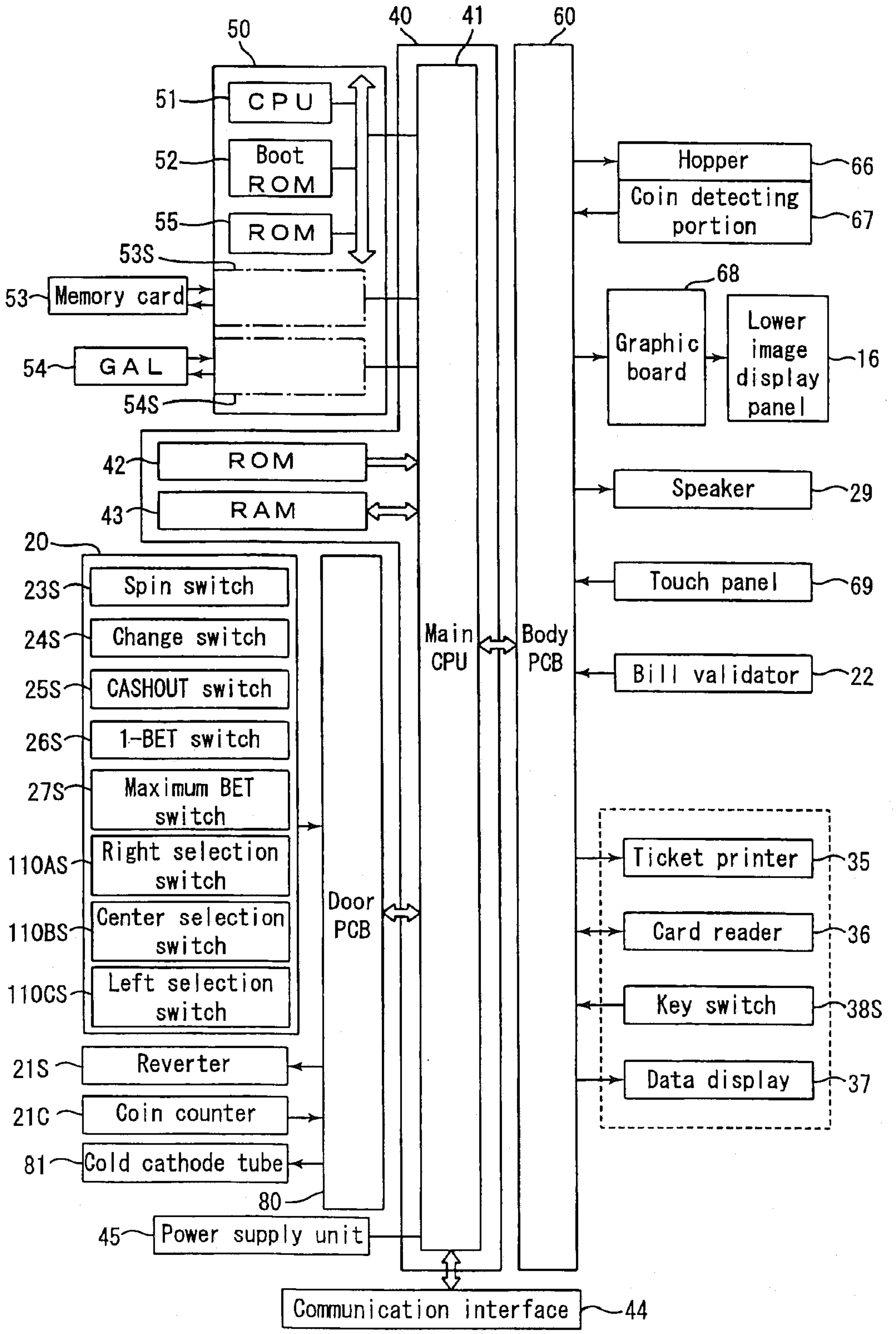

FIG. 11 is a block diagram illustrating an internal configuration of the slot machine illustrated in FIG. 7.

Figure 2:
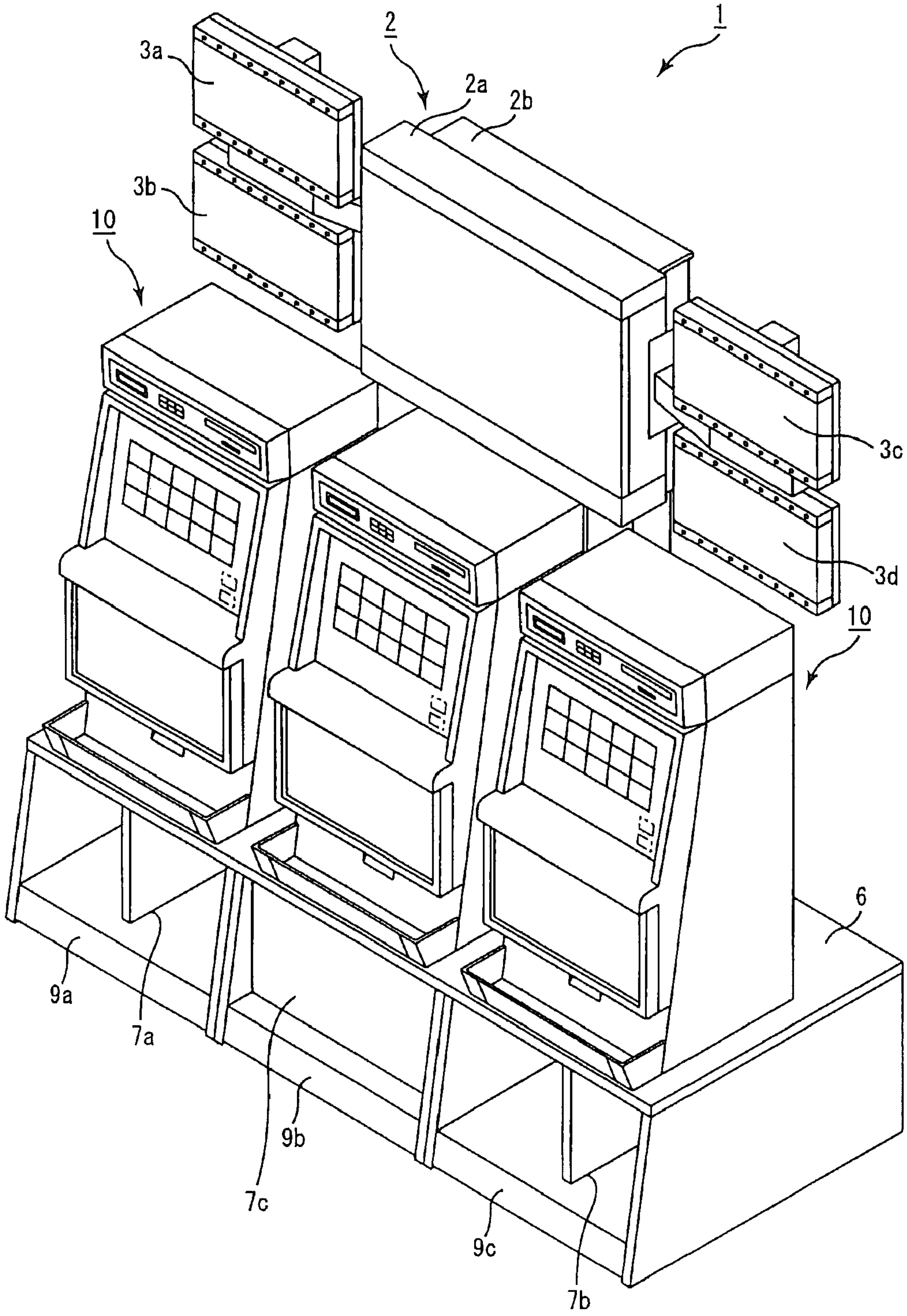
FIG. 2 is a perspective view schematically illustrating a gaming system according to an embodiment of the present invention.
Figure 12:
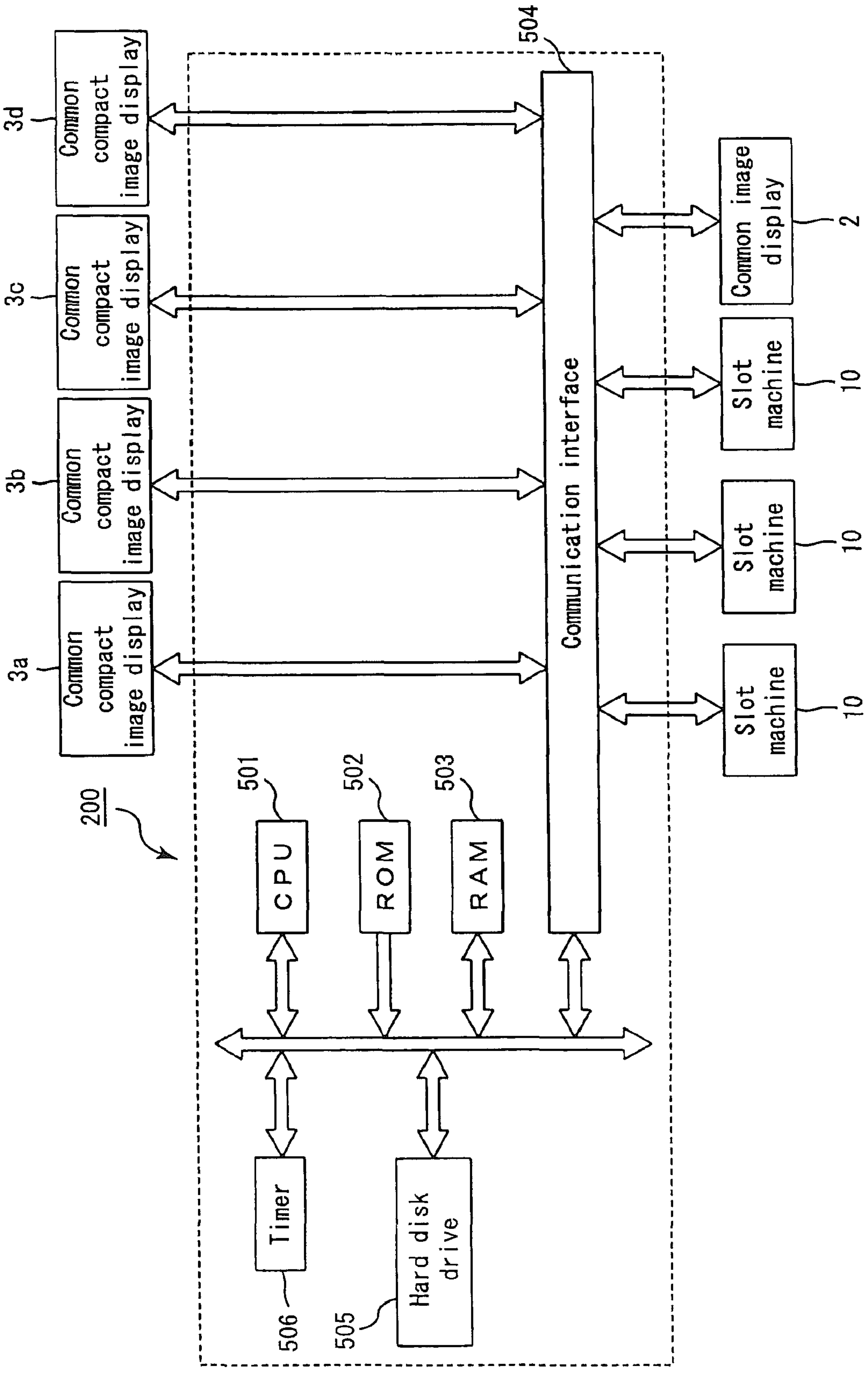

FIG. 12 is a block diagram illustrating an internal configuration of a control device provided in the gaming system illustrated in FIG. 2.

Figure 13:
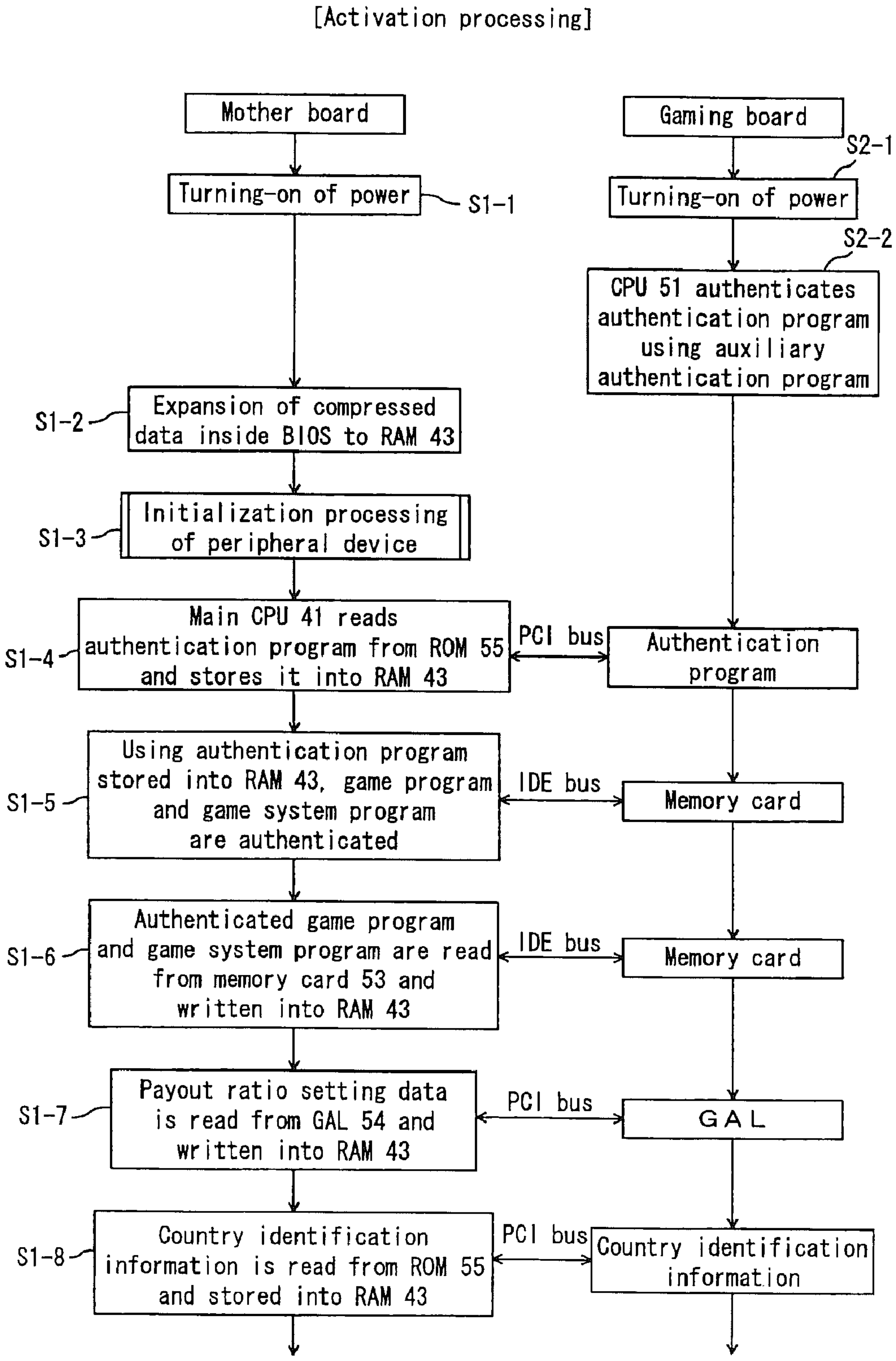

FIG. 13 is a flowchart illustrating procedure of activation processing executed in the slot machines.

Figure 14:
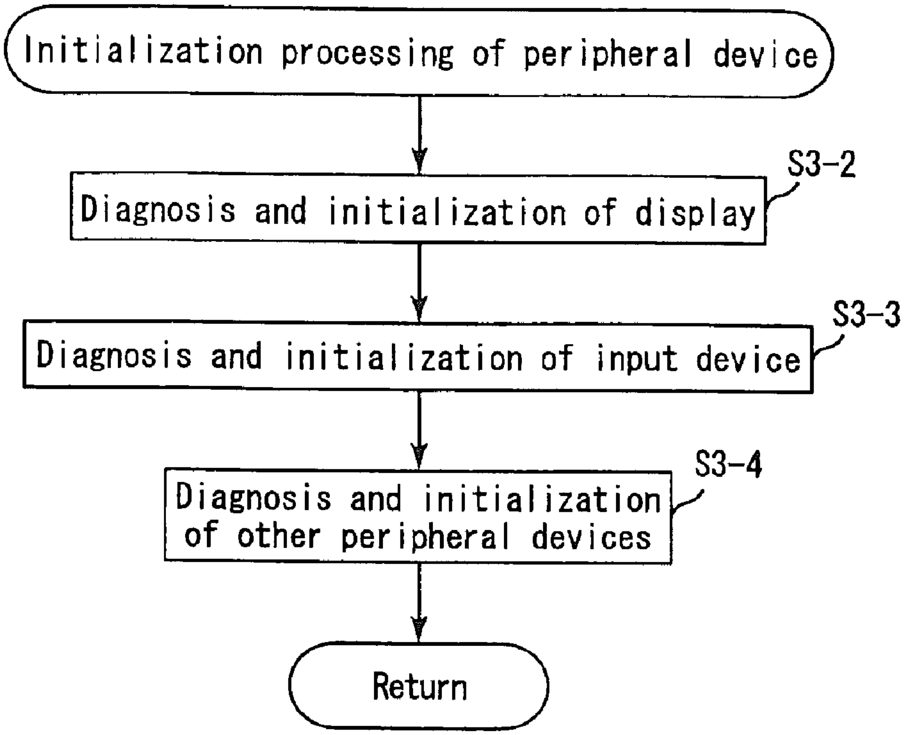

FIG. 14 is a view illustrating peripheral device initialization processing executed in the slot machines.

Figure 15:
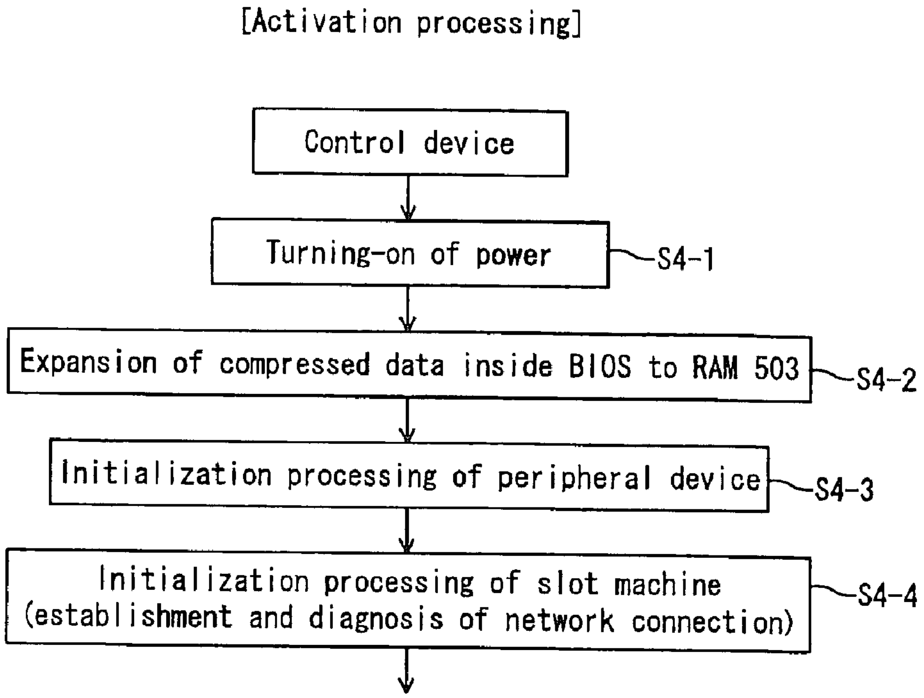

FIG. 15 is a flowchart illustrating a subroutine of activation processing executed in the control device.

Figure 16:
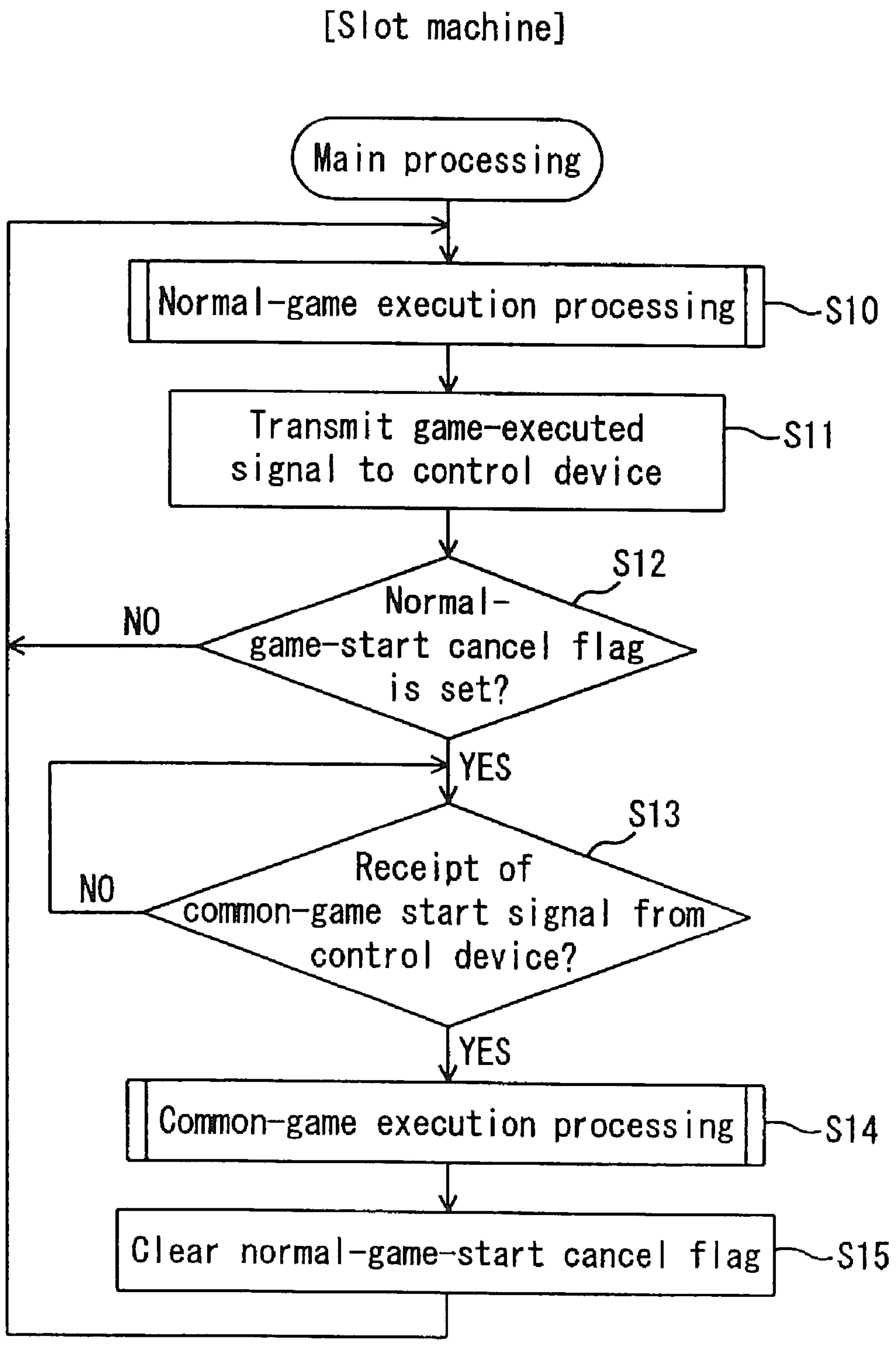

FIG. 16 is a flowchart illustrating a subroutine of main processing which is executed in the slot machines.

Figure 17:
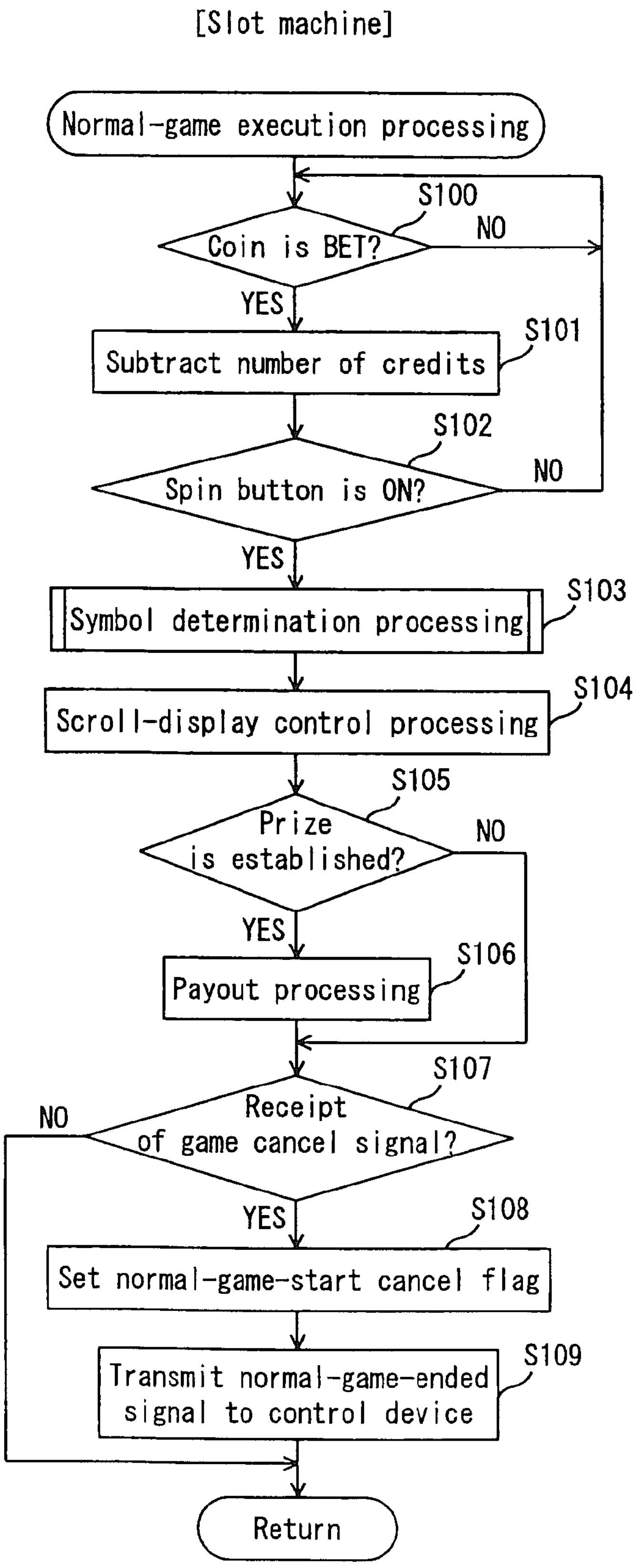

FIG. 17 is a flowchart illustrating a subroutine of normal-game execution processing executed by the slot machines.

Figure 18:
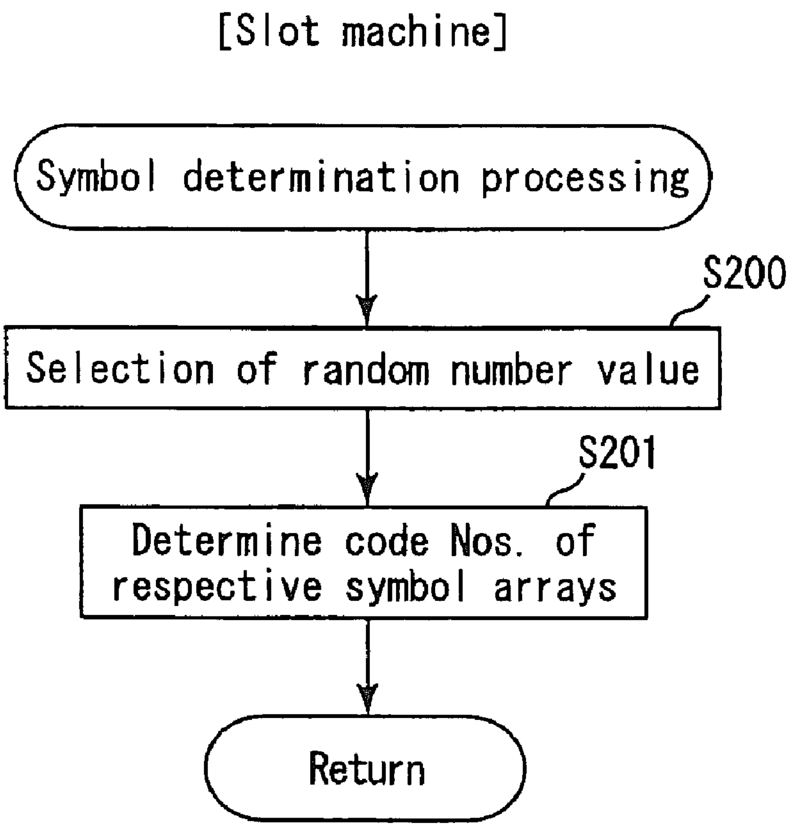

FIG. 18 is a flowchart illustrating a subroutine of symbol determination processing executed in the slot machines.

FIG. 19 is a view illustrating the relationship between a plurality of types of prizes and numbers of payouts.

Figure 20A:
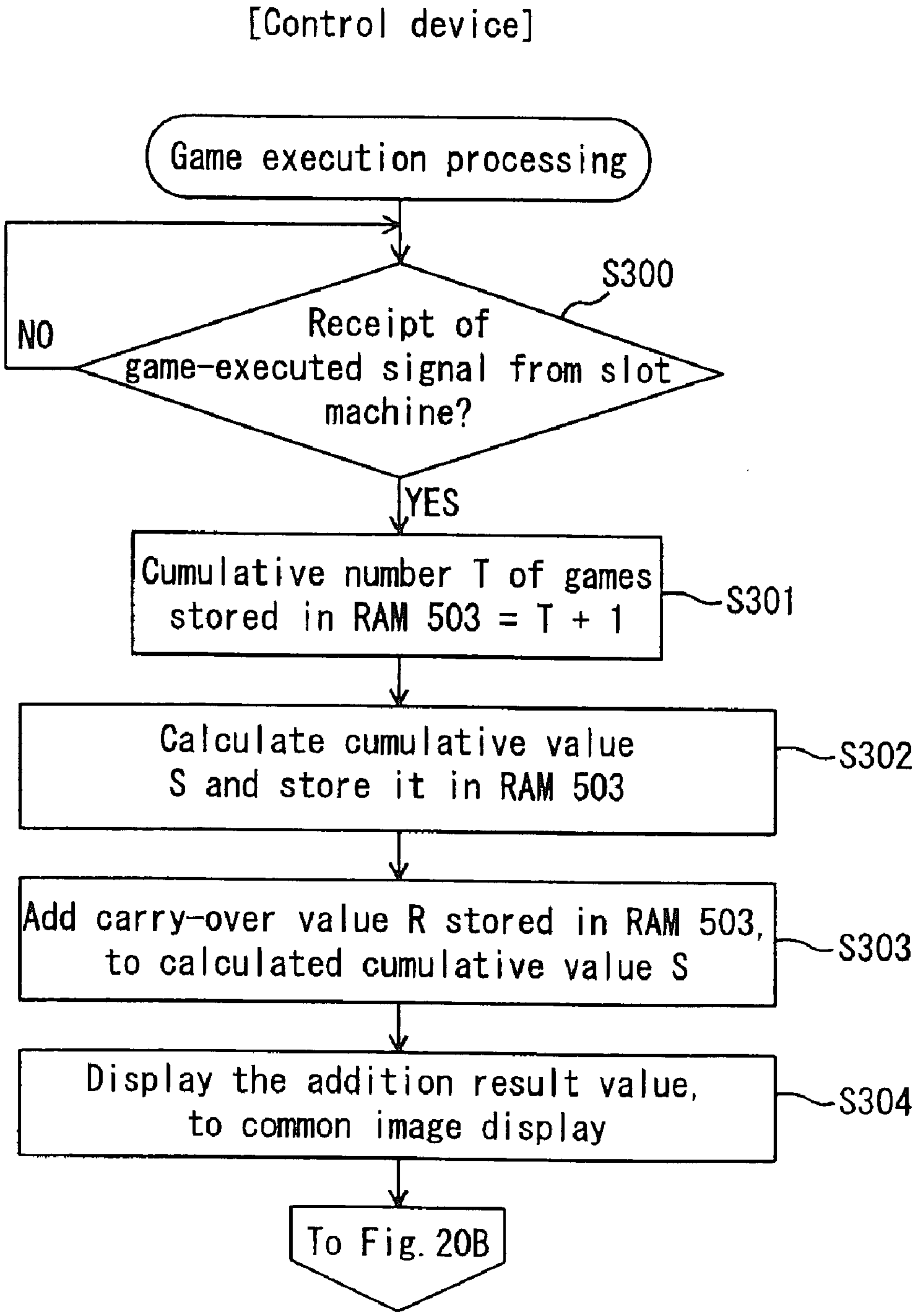

FIG. 20A is a flowchart illustrating a subroutine of game execution processing executed in the control device.

Figure 20B:
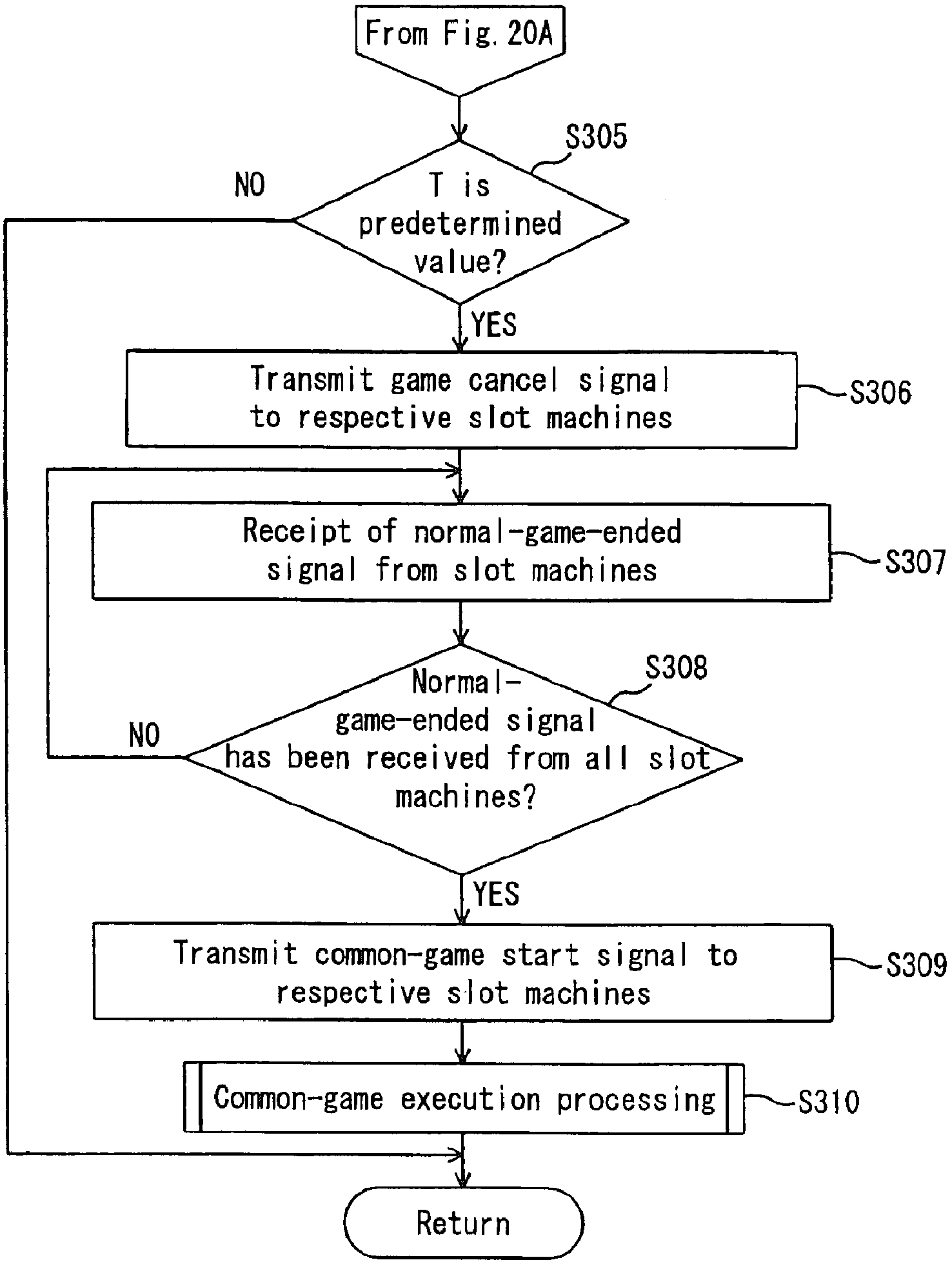

FIG. 20B is a flowchart illustrating the subroutine of the game execution processing executed in the control device.

Figure 21:
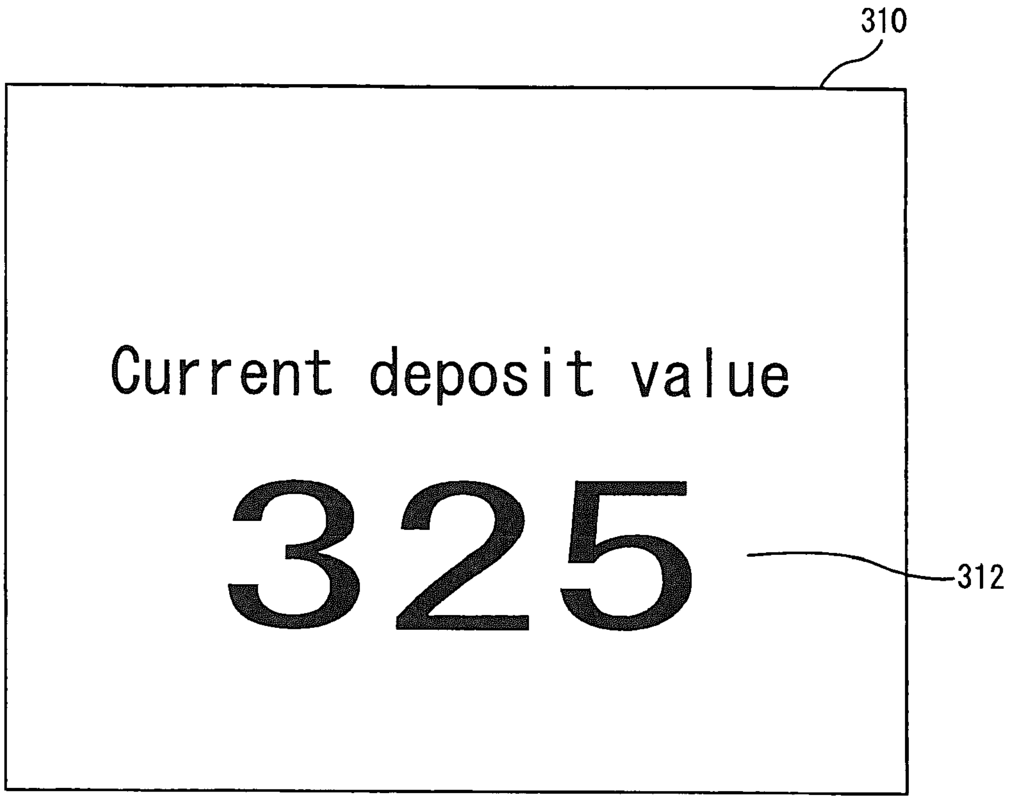

FIG. 21 is a view illustrating an exemplary display screen displayed to the common image display included in the gaming system illustrated in FIG. 2.

Figure 22:
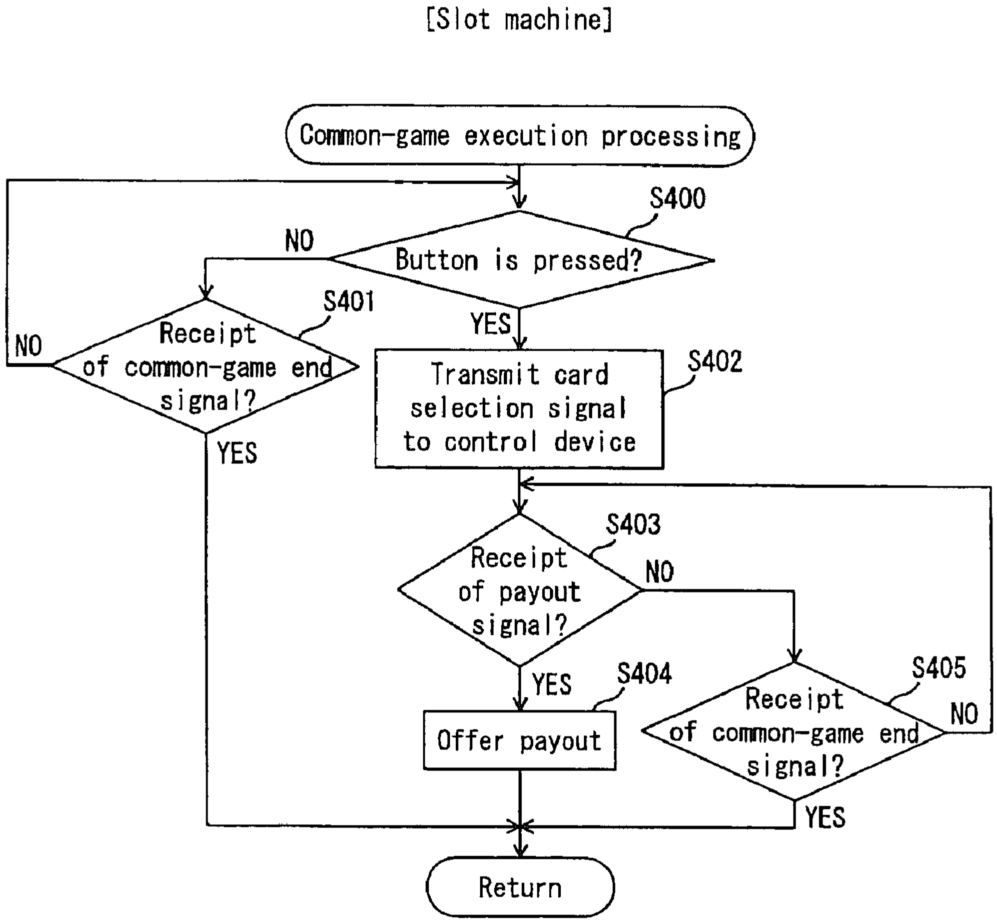

FIG. 22 is a flowchart illustrating a subroutine of common-game execution processing executed in the slot machines.

Figure 23A:
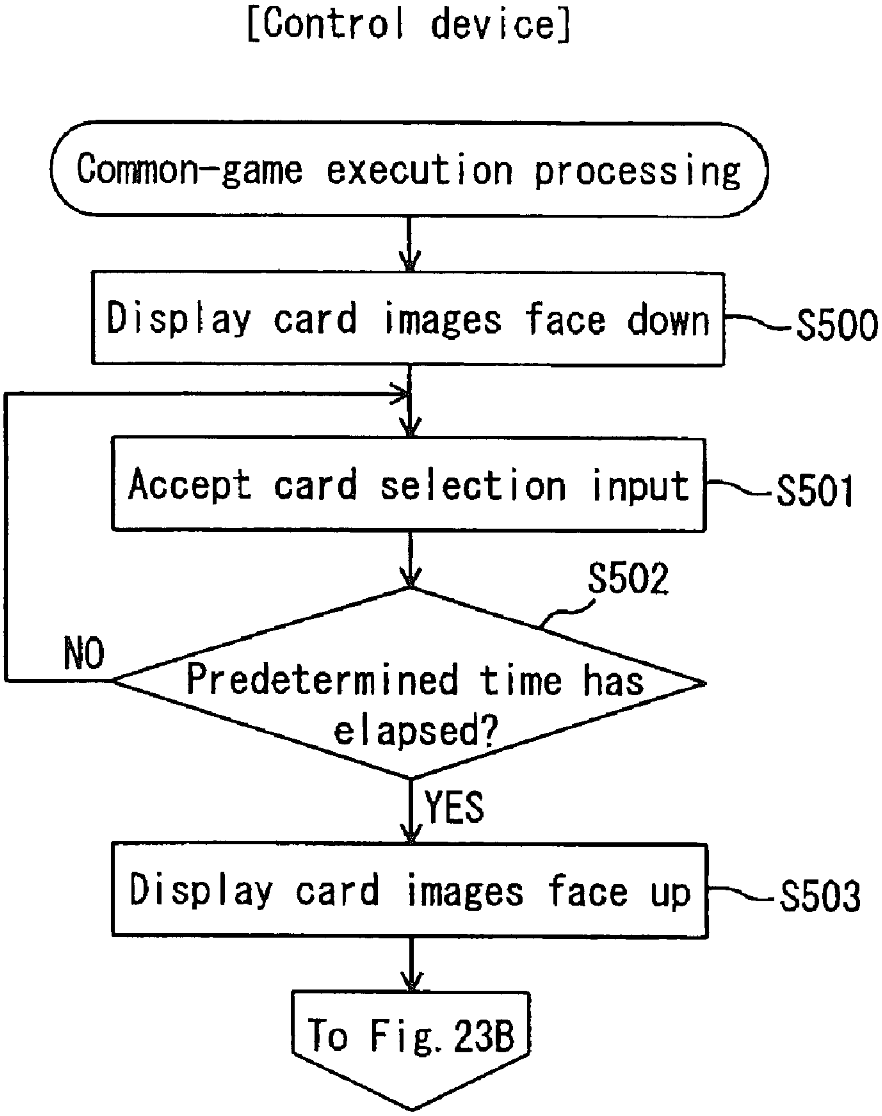

FIG. 23A is a flowchart illustrating a subroutine of common-game execution processing executed in the control device.

Figure 23B:
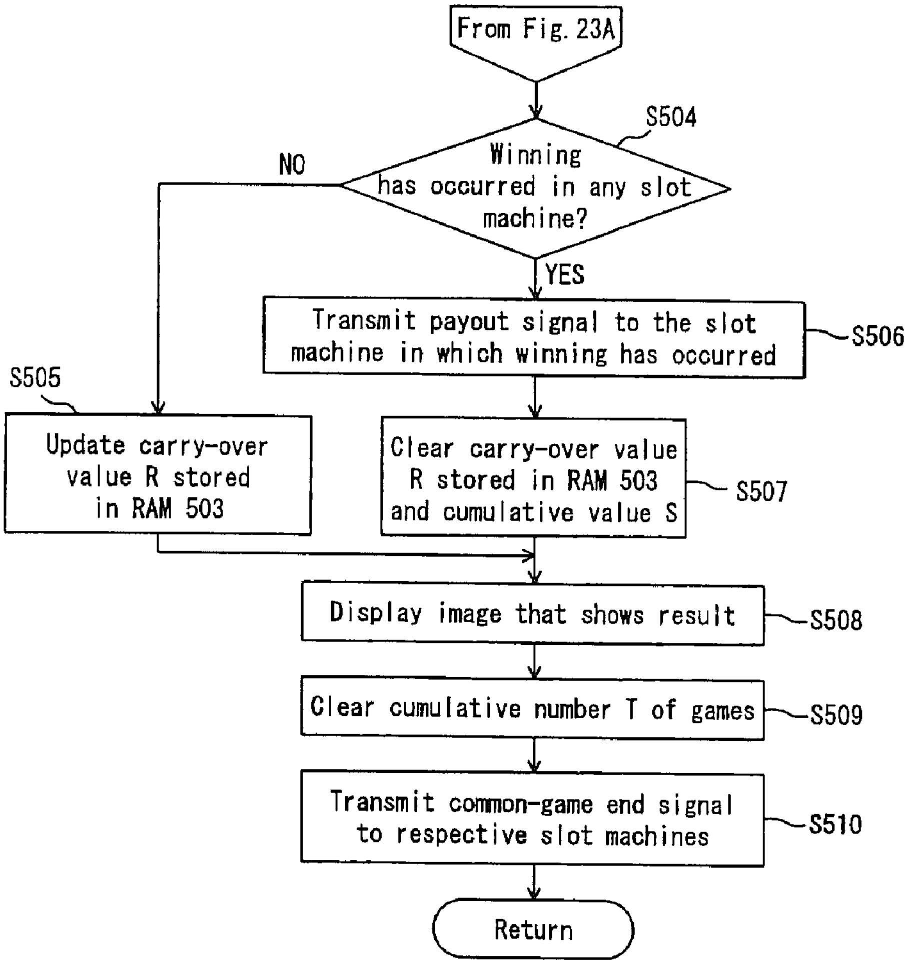

FIG. 23B is a flowchart illustrating the subroutine of the common-game execution processing executed in the control device.

Figure 24A:
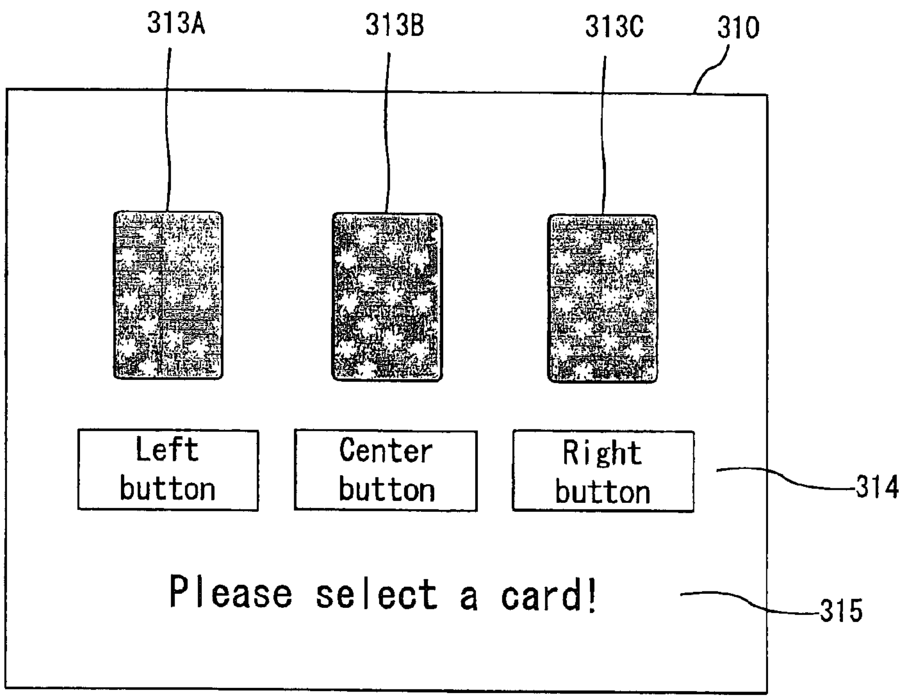

FIG. 24A is a view illustrating an exemplary display screen displayed to the common image display included in the gaming system illustrated in FIG. 2.

Figure 24B:
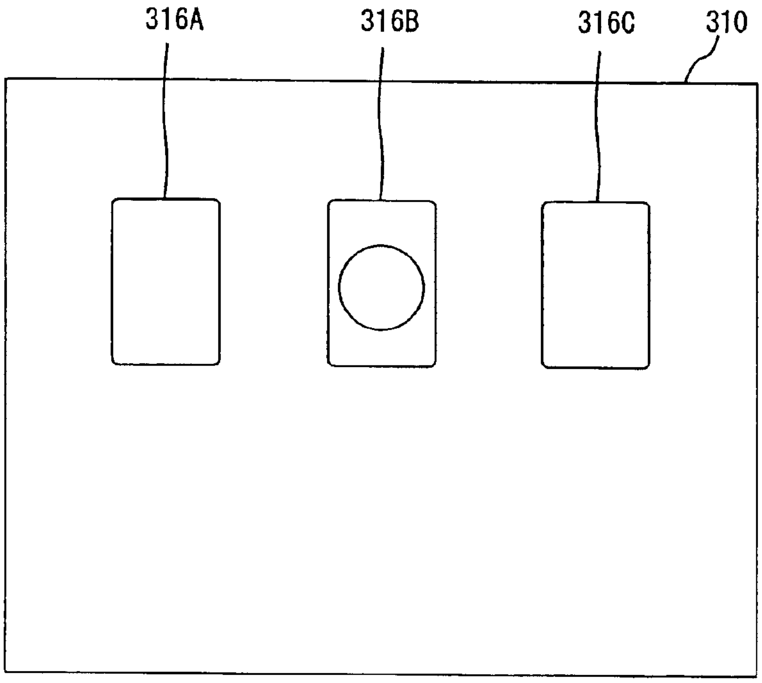

FIG. 24B is a view illustrating an exemplary display screen displayed to the common image display.

Figure 24C:
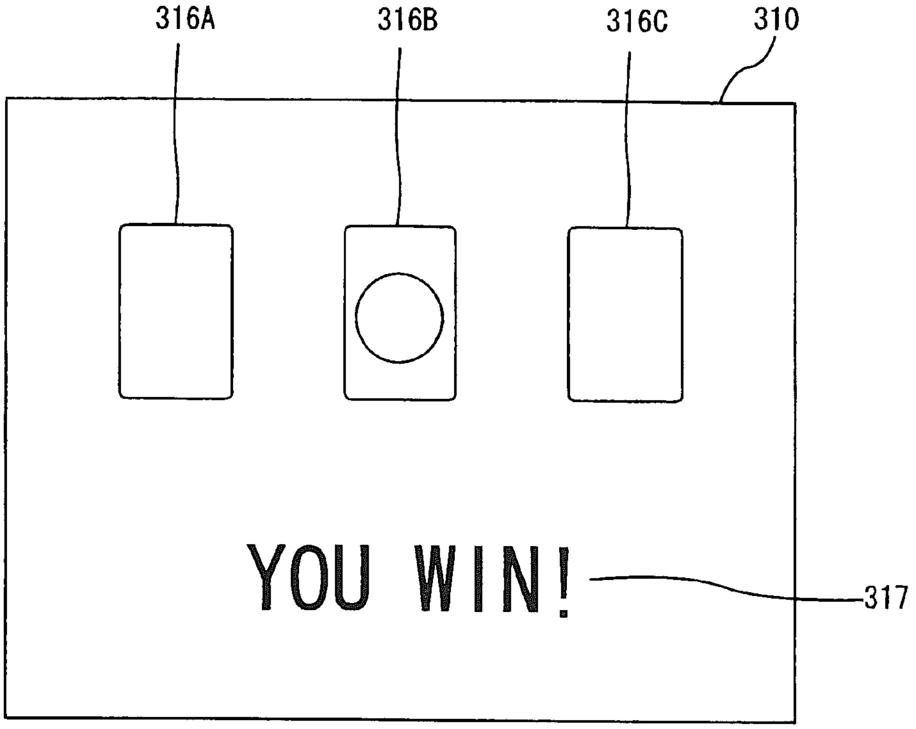

FIG. 24C is a view illustrating an exemplary display screen displayed to the common image display.

Figure 24D:
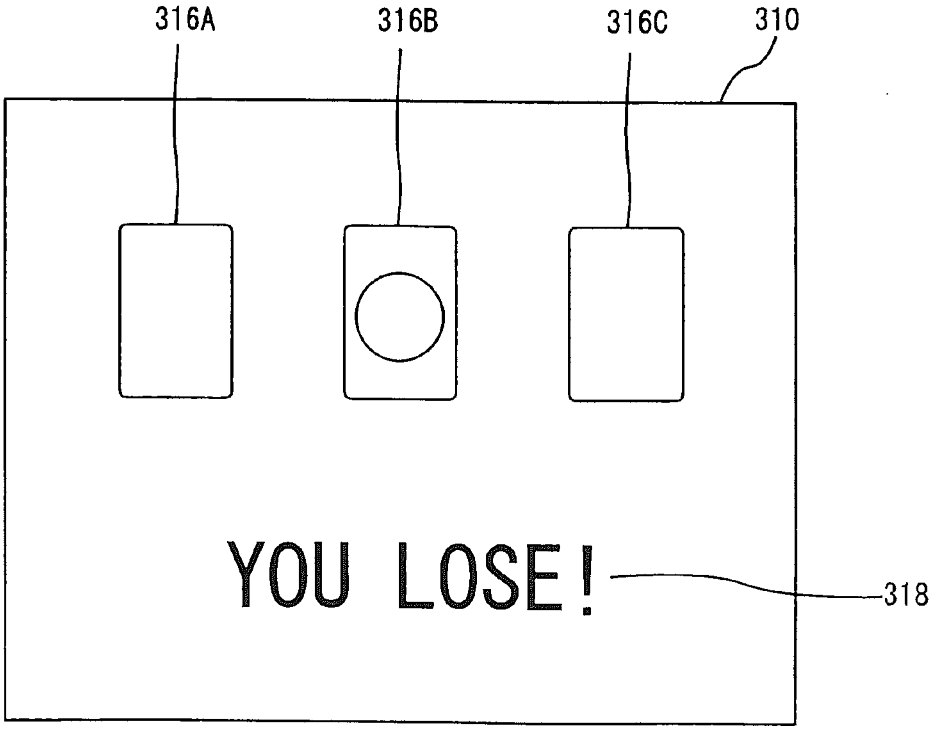

FIG. 24D is a view illustrating an exemplary display screen displayed to the common image display.

DESCRIPTION OF THE EMBODIMENTS

An embodiment of the present invention will be described based on the drawings. It is to be noted that, in the following embodiment, there will be described a case where gaming machines are slot machines.

Figure 1:
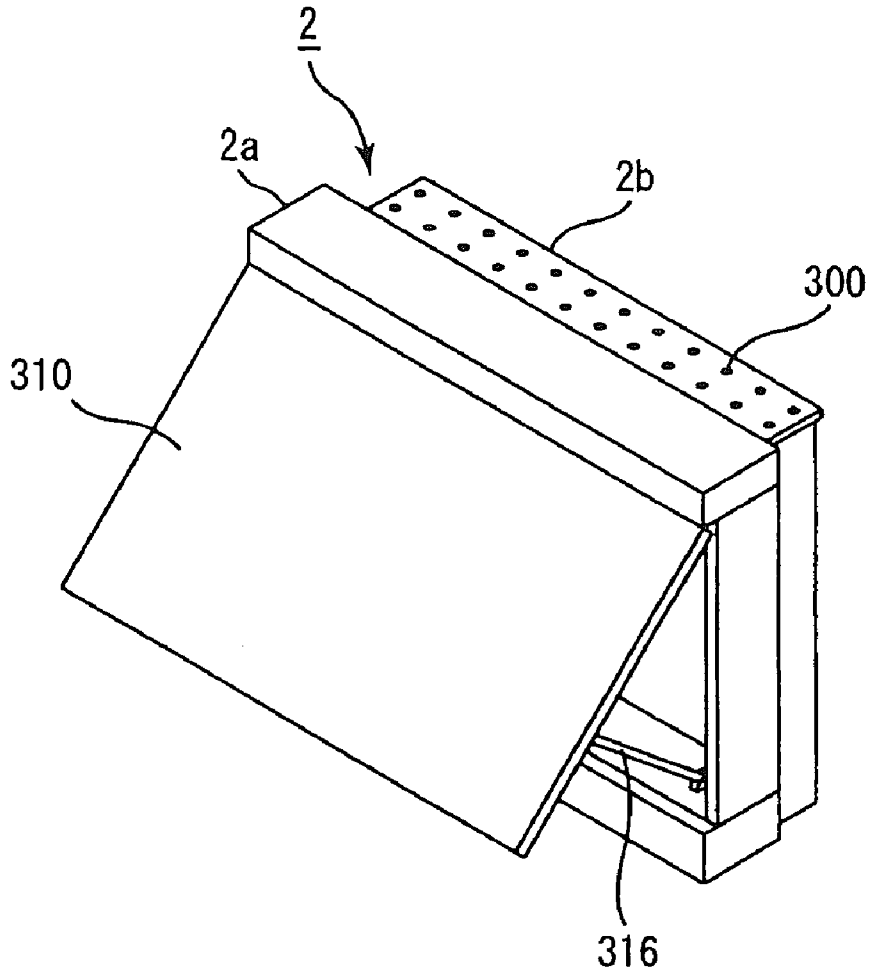
FIG. 1 is a perspective view schematically illustrating a state where a common image display panel included in a common image display according to an embodiment is held at rest by a holding bar after being rotated.

FIG. 1 is a perspective view schematically illustrating a state where a common image display panel included in a common image display according to an embodiment is held at rest by a holding bar, after being rotated.

A common image display 2 includes a common-image-display cabinet 2*a* including a common image display panel 310, and a common-image-display back surface side cabinet 2*b* including a board housing member 302 (see FIG. 6D) provided so as to cover a common-image-display-panel control board 306 (see FIG. 6G) that controls the common image display 2. Also, the common image display 2 may be structured such that the common-image-display cabinet 2*a* and the common-image-display back surface side cabinet 2*b* are formed integrally with each other, without separating the common-image-display cabinet 2*a* and the common-image-display back surface side cabinet 2*b* from each other.

Figure 6A:
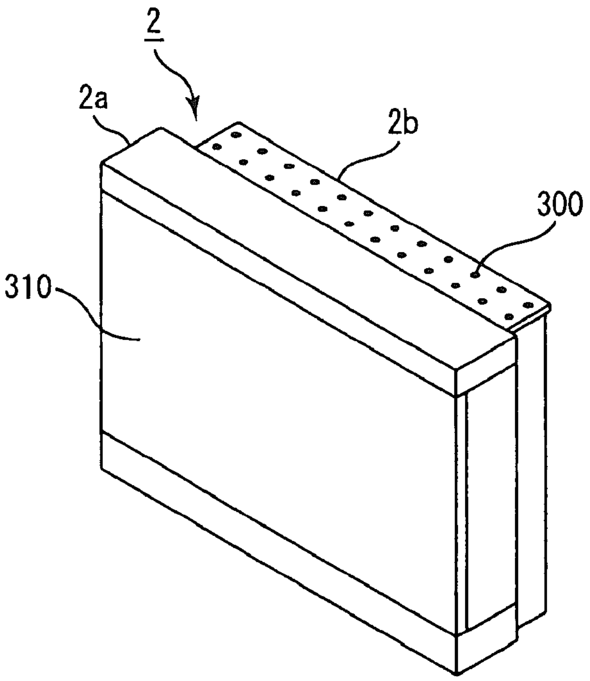
FIG. 6A is a perspective view schematically illustrating the common image display included in the gaming system illustrated in FIG. 2.
Figure 6B:
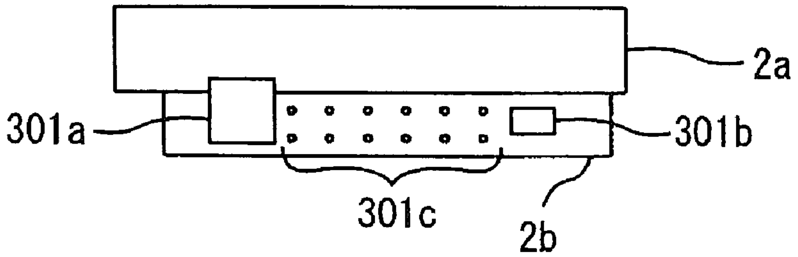
FIG. 6B is a perspective view schematically illustrating a bottom surface of the common image display included in the gaming system illustrated in FIG. 2.
Figure 6C:
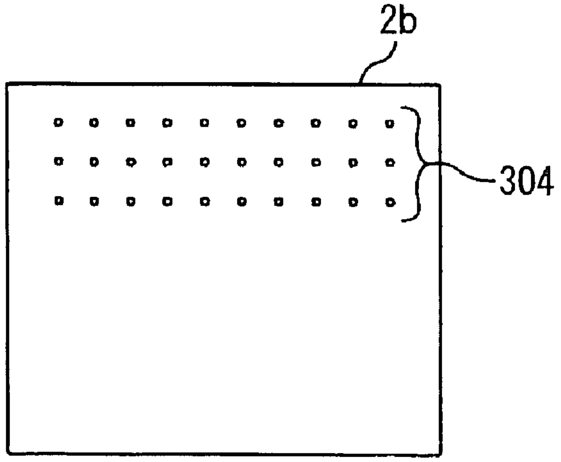
FIG. 6C is a perspective view schematically illustrating a back surface of the common image display included in the gaming system illustrated in FIG. 2.
Figure 6D:
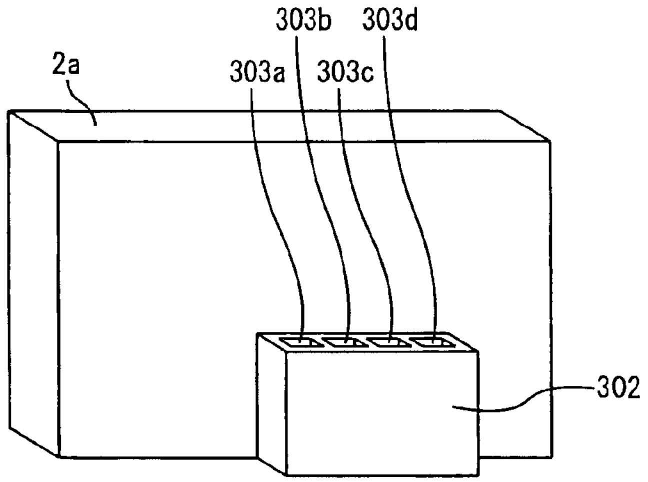
FIG. 6D is a perspective view schematically illustrating a state where a common-image-display back surface side cabinet is removed from the gaming system illustrated in FIG. 2.
Figure 6E:
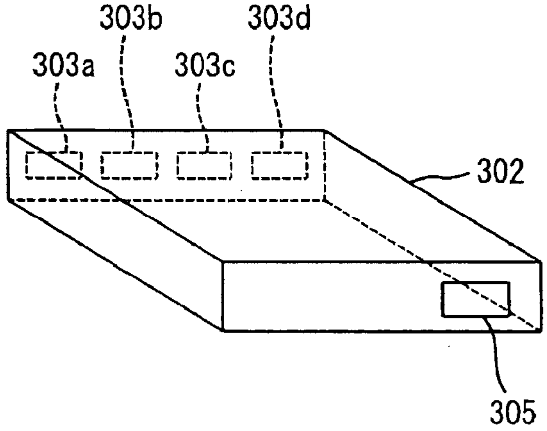
FIG. 6E is a perspective view schematically illustrating a board housing member included in the common image display illustrated in FIG. 6A.
Figure 6F:
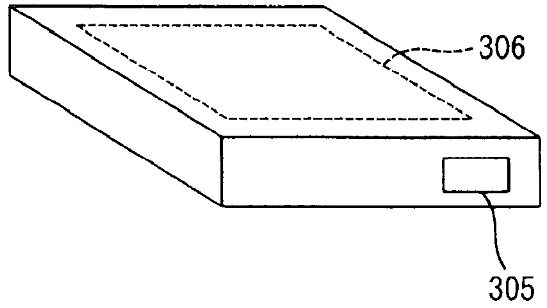
FIG. 6F is a perspective view schematically illustrating the state of the inside of the board housing member included in the common image display illustrated in FIG. 6A.
Figure 6G:
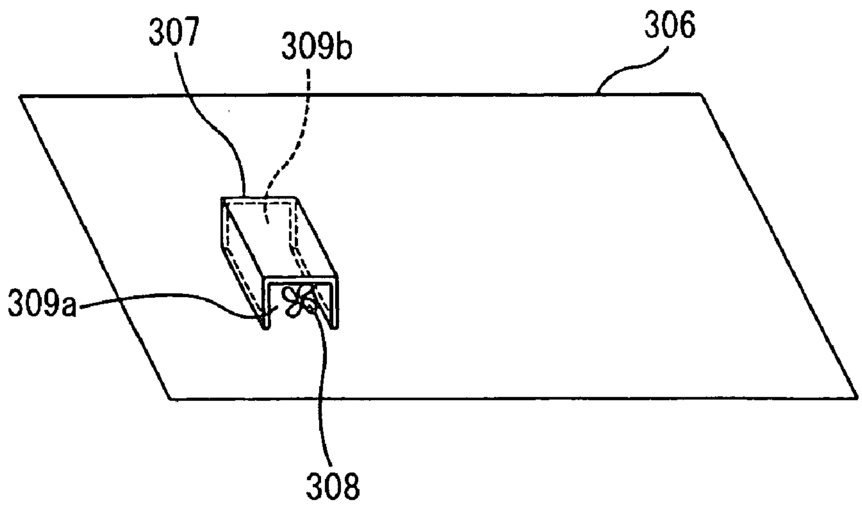
FIG. 6G is a perspective view schematically illustrating a common-image-display-panel control board included in the common image display illustrated in FIG. 6A.
Figure 6H:
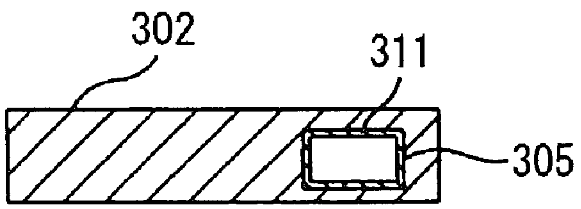
FIG. 6H is a cross-sectional view of the bottom portion of the board housing member included in the common image display illustrated in FIG. 6A.
Figure 6I:
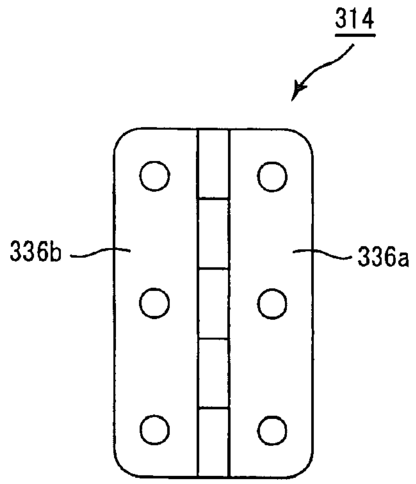
FIG. 6I is a view schematically illustrating the hinge included in the common image display illustrated in FIG. 6A.
Figure 6J:
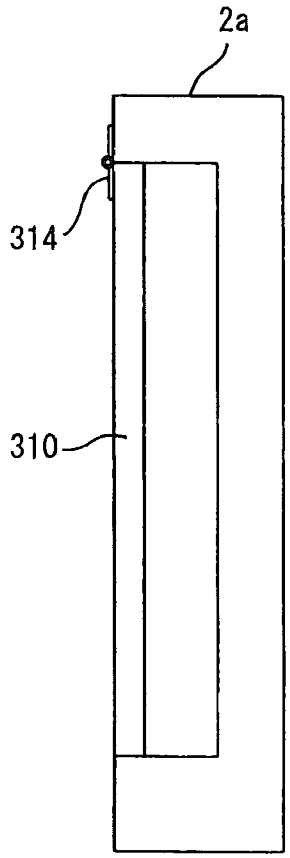
FIG. 6J is a cross-sectional view illustrating a state where a common image display panel and a common-image-display cabinet included in the common image display illustrated in FIG. 6A are coupled to each other via the hinge.

The upper end of the common image display panel 310 is mounted on the upper end of the front surface of the common-image-display cabinet 2*a*, via a hinge 314 (FIG. 6J). In FIG. 1, after being rotated upwardly with respect to the floor surface with the hinge 314 as a shaft, the common image display panel 310 is held at rest by holding bars 316 provided near the ends of the upper surface of the bottom portion of the common-image-display cabinet 2*a*. This enables performing maintenance of the common image display 2 in front of the common image display 2, thereby facilitating maintenance of the common image display 2.

The common image display panel 310 corresponds to a common flat display panel portion in the present invention.

FIG. 2 is a perspective view schematically illustrating a gaming system according to an embodiment of the present invention.

As illustrated in FIG. 2, the gaming system 1 includes: a pedestal 6; three slot machines 10 installed on the pedestal 6; the common image display 2 supported by supporting members 8 (see FIG. 3) provided on the pedestal 6 such that the common image display 2 is positioned above the upper surfaces of the slot machines 10; common compact image displays 3 (a common compact image display 3*a*, a common compact image display 3*b*, a common compact image display 3*c*, and a common compact image display 3*d*) which are installed on secondary supporting members 5 (a secondary supporting member 5*a* and a secondary supporting member 5*b*) respectively extending leftward and rightward from the common image display 2; and a control device 200 (see FIG. 12).

The pedestal 6 has leg portions 9 (a leg portion 9*a*, a leg portion 9*b*, and a leg portion 9*c*) provided on the lower side thereof and, also has a hollow space provided inside thereof. In the hollow space included in the pedestal 6, there is provided a control-device housing portion 203 (see FIG. 4B) in which the control device 200 is housed (not illustrated). Further, in the hollow space included in the pedestal 6, there are plate-shaped pedestal supporting members 7 (a pedestal supporting member 7*a*, a pedestal supporting member 7*b* and a pedestal supporting member 7*c*) provided perpendicularly to a bottom surface of the pedestal 6, which enhances the strength of the pedestal 6.

It is to be noted that, the slot machines 10, the common image display 2 and the common compact image displays 3 are connected to the control device 200 such that they can communicate with the control device 200, through communication cables placed in the hollow space included in the pedestal 6, the flow channels included in the supporting members 8, and the hollow space provided within the secondary supporting members 5.

The flow channels included in the supporting members 8 form airflow paths and also form arrangement paths for arranging communication cables therein.

Figure 3:
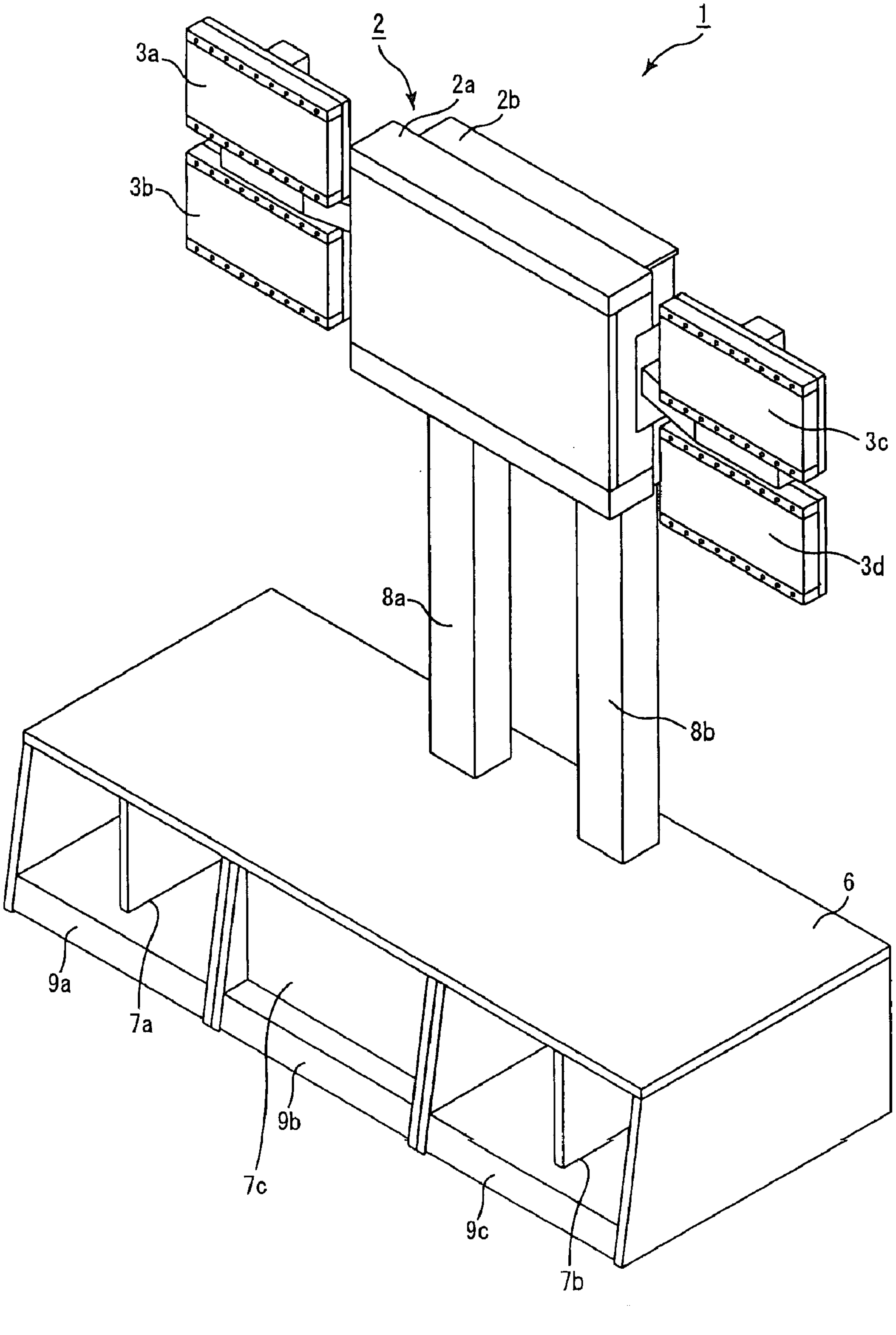
FIG. 3 is a perspective view schematically illustrating a state where slot machines are removed from the gaming system illustrated in FIG. 2.

FIG. 3 is a perspective view schematically illustrating a state where the slot machines are removed from the gaming system illustrated in FIG. 2.

The common image display 2 is supported by the supporting members 8 (the supporting member 8*a* and the supporting member 8*b*) which are supported at their lower ends by the pedestal 6. The supporting members 8 which support the common image display 2 are provided on the back surface side of the slot machines 10, which enables installation of the common image display 2 without causing disfigurement.

Figure 4A:
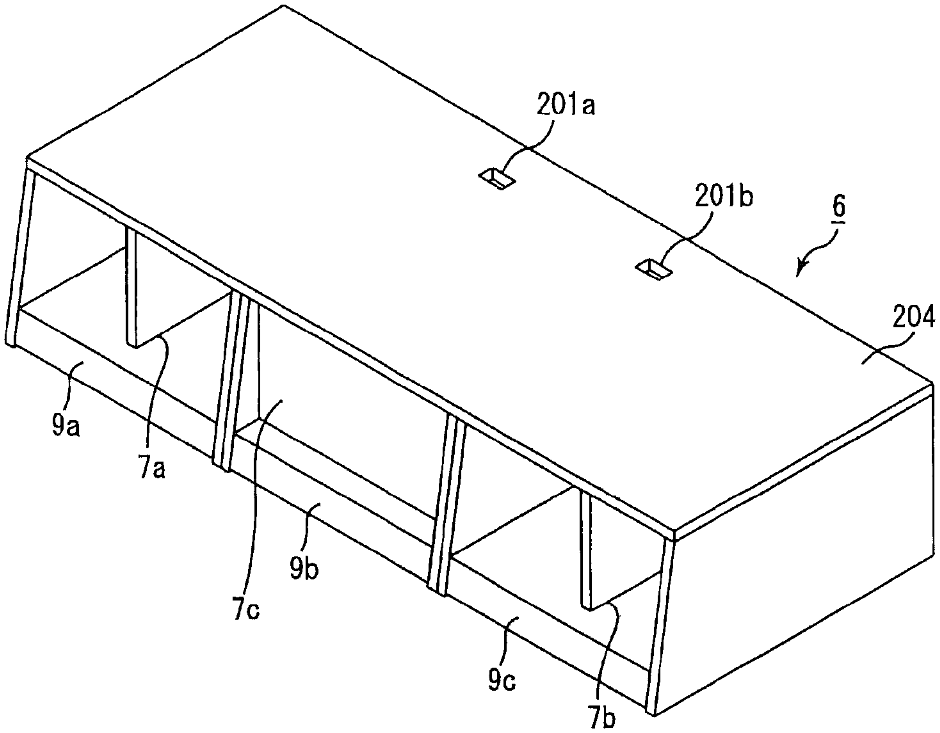
FIG. 4A is a perspective view schematically illustrating the pedestal included in the gaming system illustrated in FIG. 2.

FIG. 4A is a perspective view schematically illustrating the pedestal included in the gaming system illustrated in FIG. 2.

The pedestal 6 has a horizontally-long rectangular parallelepiped shape, and the installation surface 204 thereof is provided, on the back side, with the rectangular-shaped pedestal upper surface openings 201 (the pedestal upper surface opening 201*a* and the pedestal upper surface opening 201*b*) arranged laterally at predetermined intervals. The pedestal upper surface openings 201 are openings for receiving the supporting-member opening protrusions 150 (see FIG. 5A) included in the supporting members 8.

Figure 4B:
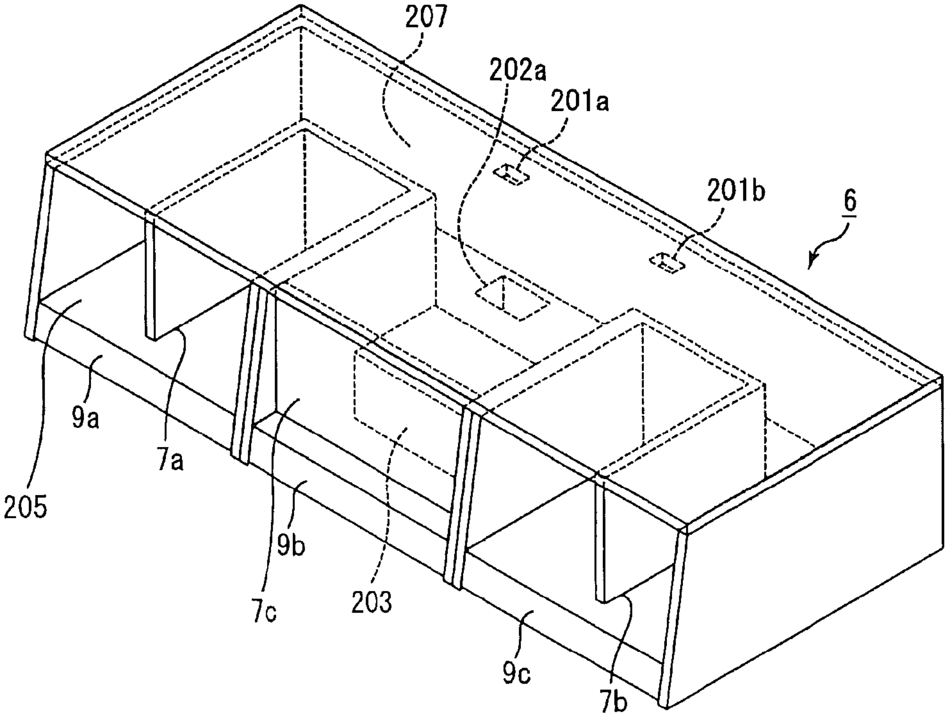
FIG. 4B is a perspective view schematically illustrating the state of the inside of the pedestal included in the gaming system illustrated in FIG. 2.

FIG. 4B is a perspective view schematically illustrating the state of the inside of the pedestal included in the gaming system illustrated in FIG. 2.

At substantially the center of the inside of the pedestal, there is provided the control-device housing portion 203 in which the control device 200 is housed. The pedestal supporting member 7*c* is provided on the front face side of the control-device housing portion 203, and the pedestal supporting member 7*a* and the pedestal supporting member 7*b* are provided on the lateral face side of the control-device housing portion 203; therefore, the control-device housing portion 203 is invisible from the outside. Further, the plate-shaped pedestal supporting members 7 support the installation surface 204, thereby forming a hollow space within the pedestal. Further, the pedestal supporting member 7*a* and the pedestal supporting member 7*b* have angular-U shapes, which further enhances the strength of the pedestal 6.

The control-device housing portion 203 corresponds to the housing space according to the present invention.

Just under the pedestal upper surface opening 201*a* provided in the installation surface 204, a rectangular-shaped pedestal bottom surface opening 202*a* which communicates with external air is provided in the pedestal bottom surface portion 205. Accordingly, the air flowed into the hollow space included in the pedestal 6 through the pedestal bottom surface opening 202*a* can easily flow into the flow channel included in the supporting member 8 through the pedestal upper surface opening 201*a*. Further, with respect to the pedestal upper surface opening 201*b*, similarly to with respect to the pedestal upper surface opening 201*a*, a rectangular-shaped pedestal bottom opening 202*b* which communicates with external air is provided in the pedestal bottom surface portion 205 (not illustrated) It is to be noted that the pedestal bottom surface portion 205 is supported by the leg portions 9 (the leg portion 9*a*, the leg portion 9*b* and the leg portion 9*c*) and, therefore, is provided at a state where it is floated from the floor surface.

Further, while, in the present embodiment, there has been described a case where the pedestal bottom surface openings 202 (the pedestal bottom surface opening 202*a* and the pedestal bottom surface opening 202*b*) have rectangular shapes, the shapes of the pedestal bottom surface openings are not particularly limited and may be circular shapes.

Figure 5A:
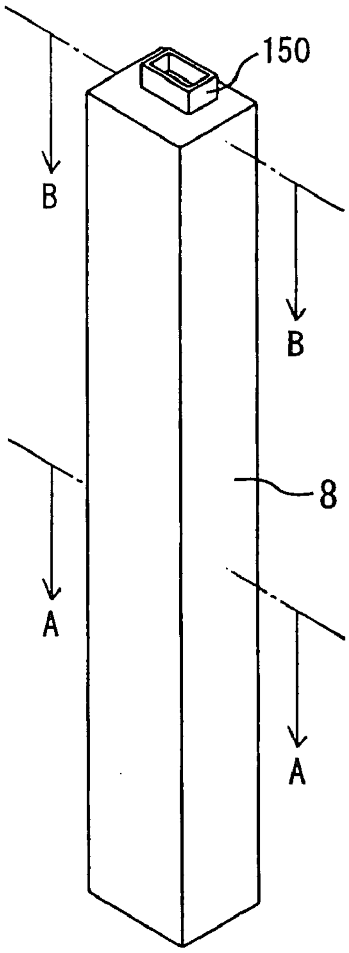
FIG. 5A is a perspective view schematically illustrating a supporting member included in the gaming system illustrated in FIG. 2.

FIG. 5A is a perspective view schematically illustrating a supporting member included in the gaming system illustrated in FIG. 2.

The supporting member 8 has a longitudinally-long rectangular parallelepiped shape and has the supporting-member opening protrusions 150 having rectangular parallelepiped shapes which are provided at the respective ends of the supporting member 8 (one on the lower end side is not illustrated). Further, the supporting-member opening protrusions 150 are open inside thereof, and the supporting member 8 is provided, inside thereof, with a flow channel which is in communication with the openings included in the respective supporting-member opening protrusions 150 provided at the respective ends of the supporting member 8 (not illustrated)

Figure 5B:
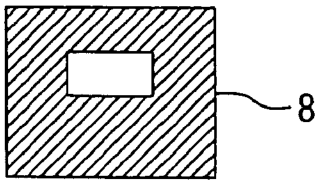
FIG. 5B is a cross-sectional view of the supporting member illustrated in FIG. 5A, taken along the line A-A.

FIG. 5B is a cross-sectional view of the supporting member illustrated in FIG. 5A, taken along the line A-A.

As illustrated in FIG. 5B, there is a hollow portion inside the supporting member 8. The hollow portion forms the flow channel that is in communication with the openings of the supporting-member opening protrusions 150 provided at the respective ends of the supporting member 8.

Figure 5C:
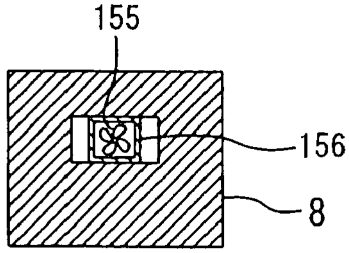
FIG. 5C is a cross-sectional view of the supporting member illustrated in FIG. 5A, taken along the line B-B.

FIG. 5C is a cross-sectional view of the supporting member illustrated in FIG. 5A, taken along the line B-B.

As illustrated in FIG. 5C, at substantially the center of the hollow portion forming the flow channel, there is provided a fan mounting frame 156 formed to be hollow inside thereof, and there is further provided the fan 155 inside of the fan mounting frame 156. As just described, the fan 155 that transfers the air upwardly is provided within the flow channel included in the supporting member 8.

It is to be noted that the hollow portions that exist outside the fan mounting frame 156 form arrangement paths for arranging communication cables therein.

Since the fan 155 is provided at a portion near the upper end of the supporting member 8, it is possible to efficiently make the air within the flow channel flow into the space within the board housing member 302 and the internal space included in the common-image-display back surface side cabinet 2*b*.

While, in the present embodiment, there has been described a case where a single fan 155 is provided within the flow channel included in the supporting member 8, the number of fans to be provided within the flow channel included in the supporting member 8 is not particularly limited, and may be more than one. For example, in cases where fans are provided on the upper end side and the lower end side of the supporting member, it is possible to cause the air flowed into the pedestal bottom surface openings 202 (see FIG. 4B) which are provided in the pedestal 6 and communicated with external air to efficiently flow into the space within the board housing member 302 and the internal space included in the common-image-display back surface side cabinet 2*b*.

FIG. 6A is a perspective view schematically illustrating the common image display included in the gaming system illustrated in FIG. 2.

The common image display 2 includes the common-image-display cabinet 2*a* and the common-image-display back surface side cabinet 2*b*. The common image display panel 310 is provided in an opening provided over substantially the entire front surface of the common-image-display cabinet 2*a*. In the upper surface of the common-image-display back surface side cabinet 2*b*, there are provided the plurality of circular-shaped common-image-display upper openings 300.

The common image display panel 310 is not particularly limited, so long as it is a panel capable of displaying images thereto. The common image display panel 310 can be, for example, a liquid crystal panel, a plasma panel, an organic electroluminescence panel or the like.

FIG. 6B is a perspective view schematically illustrating a bottom surface of the common image display included in the gaming system illustrated in FIG. 2.

In the bottom surface of the common-image-display back surface side cabinet 2*b*, there are provided the common-image-display bottom openings 301 (the common-image-display bottom opening 301*a* and the common-image-display bottom opening 301*b*) having rectangular shapes in different sizes, arranged laterally at predetermined intervals. The common-image-display bottom opening 301*a* is provided straddling the common image display cabinet 2*a* and the common-image-display back surface side cabinet 2*b*. Further, in the bottom surface of the common-image-display back surface side cabinet 2*b*, there are provided a plurality of circular-shaped common-image-display bottom openings 301*c*, between the common-image-display bottom opening 301*a* and the common-image-display bottom opening 301*b*.

The common-image-display bottom opening 301*a* is an opening which receives the supporting member 8. The common-image-display bottom opening 301*b* is an opening which receives the supporting-member opening protrusion 150 included in the supporting member 8.

FIG. 6C is a perspective view schematically illustrating a back surface of the common image display included in the gaming system illustrated in FIG. 2.

At an upper portion of the back surface of the common-image-display back surface side cabinet 2*b*, there are provided a plurality of circular-shaped common-image-display back surface openings 304. Since the common-image-display back surface openings 304 are provided at the upper portion of the back surface of the common-image-display back surface side cabinet 2*b*, the heated air within the common image display 2 can be efficiently ejected.

FIG. 6D is a perspective view schematically illustrating a state where the common-image-display back surface side cabinet is removed from the common image display included in the gaming system illustrated in FIG. 2.

The board housing member 302 provided on the right side of the common-image-display back surface side cabinet 2*b* (see FIG. 7) is hollow inside thereof. At the upper portion of the board housing member 302, there are provided rectangular-shaped board-housing-member upper openings 303 (board-housing-member upper opening 303*a*, board-housing-member opening 303*b*, board-housing-member upper opening 303*c* and board-housing-member upper opening 303*d*) arranged laterally at predetermined intervals. Further, a space is provided between the common-image-display cabinet 2*a* and the board housing member 302.

It is to be noted that the material of the board housing member 302 is not particularly limited, but is preferably a metal with a high thermal conductance, such as aluminum and copper.

While, in the present embodiment, there has been described a case where the board housing member 302 has outer surfaces with flat shapes, the shapes of the outer surfaces of the board housing member are not particularly limited, and may be shapes which make the surface area of the outer surfaces of the board housing member large; for example, the board housing member may be provided with a plurality of protrusions on its outer surfaces.

FIG. 6E is a perspective view schematically illustrating the board housing member included in the common image display illustrated in FIG. 6A.

The board housing member 302 has a rectangular-shaped board-housing-member bottom opening 305 provided at the bottom portion thereof (the front side in FIG. 6E). The board-housing-member bottom opening 305 is provided at a portion which is positioned at the upper portion with respect to the common-image-display bottom opening 301*a* provided in the bottom surface of the common-image-display back surface side cabinet 2*b* (see FIG. 7).

FIG. 6F is a perspective view schematically illustrating the state of the inside of the board housing member included in the common image display illustrated in FIG. 6A.

Within the board housing member 302, there is provided the common-image-display-panel control board 306 which controls the common image display 7.

FIG. 6G is a perspective view schematically illustrating the common-image-display-panel control board included in the common image display illustrated in FIG. 6A.

The common-image-display-panel control board 306 has a CPU (not illustrated) provided on the left side thereof, and has a CPU housing member 307 with a rectangular parallelepiped shape provided in such a way as to cover the CPU. The CPU housing member 307, which is hollow inside thereof, has rectangular-shaped CPU-housing-member openings 309 (CPU-housing-member opening 309*a* and CPU-housing-member opening 309*b*) provided at the upper portion thereof (the back side in FIG. 6G) and at the bottom portion thereof (the front side in FIG. 6G), and is opened over substantially the entire face thereof that abuts with the common-image-display-panel control board 306. Further, within the CPU housing member 307, there is provided a CPU fan 308 that transfers the air flowed into the CPU-housing-member opening 309*a,* toward the CPU-housing-member opening 309*b*. Further, in FIG. 6G, members for providing the CPU fan 308 and the like are not illustrated, for ease of description.

It is to be noted that, the material of the CPU housing member 307 is not particularly limited, but is preferably a metal with a high thermal conductance, such as aluminum and copper.

While, in the present embodiment, there has been described a case where the CPU housing member 307 has outer surfaces with flat shapes, the shapes of the outer surfaces of the CPU housing member are not particularly limited in the present invention, and may be shapes which make the surface area of the outer surfaces of the CPU housing member large; for example, the CPU housing member may be provided with a plurality of protrusions on its outer surfaces.

FIG. 6H is a cross-sectional view of the bottom portion of the board housing member included in the common image display illustrated in FIG. 6A.

A sealing member 311 made of an elastic material is attached to the entire periphery of the inner wall surface of the board-housing-member bottom opening 305 provided in the bottom portion of the board housing member 302.

With the sealing member 311, the inner wall surface of the board-housing-member bottom opening 305 is intimately attached to the outer wall surface of the supporting-member opening protrusion 150*b* provided in the supporting member 8*a,* which causes the space within the board housing member 302 to be communicated with the flow channel included in the supporting member 8*a,* with no gap interposed therebetween (see FIG. 7).

It is to be noted that the material of the sealing member 311 is not particularly limited so long as it is an elastic material. Examples of the material of the sealing member 311 may include foam sponge and rubber.

FIG. 6I is a view schematically illustrating the hinge included in the common image display illustrated in FIG. 6A.

The hinge 314 includes a hinge constituent member 336*a* and a hinge constituent member 336*b,* and the hinge constituent member 336*a* and the hinge constituent member 336*b* are rotatable with the hinge axis as the center.

FIG. 6J is a cross-sectional view illustrating a state where the common image display panel and the common-image-display cabinet included in the common image display illustrated in FIG. 6A are coupled to each other, via the hinge.

The upper end of the common image display panel 310 is mounted on the upper end of the front surface of the common image display cabinet 2*a,* via the hinge 314. This allows the common image display panel 310 to rotate upwardly and downwardly with respect to the floor surface with the hinge 314 as a shaft.

Figure 6K:
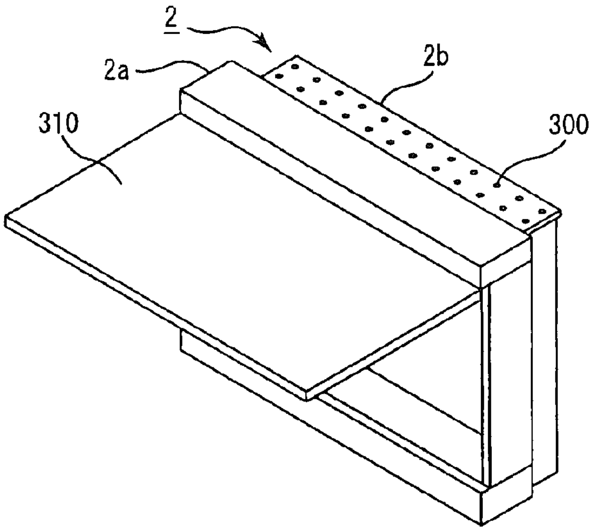
FIG. 6K is a view schematically illustrating the common image display included in the gaming system illustrated in FIG. 2.

FIG. 6K is a view schematically illustrating the common image display included in the gaming system illustrated in FIG. 2.

There is illustrated a state where the common image display panel 310 has been rotated upwardly with respect to the floor surface with the hinge 314 as a shaft.

Figure 6L:
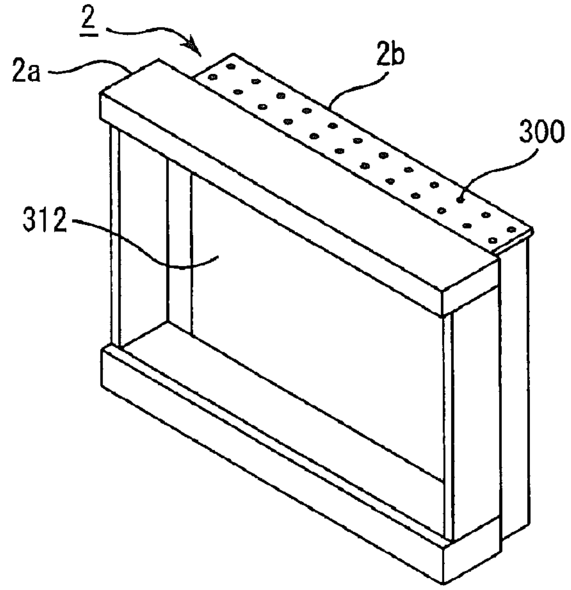
FIG. 6L is a perspective view schematically illustrating a state where the common image display panel is removed from the common image display included in the gaming system illustrated in FIG. 2.

FIG. 6L is a perspective view schematically illustrating a state where the common image display panel is removed from the common image display included in the gaming system illustrated in FIG. 2.

The common image display cabinet 2*a* is provided with an opening over substantially the entire back surface thereof, and a sheet metal 312 is removably provided in the opening.

Further, the method for mounting the sheet metal 312 on the common-image-display cabinet 2*a* is not particularly limited so long as the sheet metal 312 is made removable and, for example, the sheet metal 312 can be mounted thereon using securing members, such as screws.

Further, the material of the sheet metal 312 is not particularly limited, but is preferably a metal with a high thermal conductance, such as aluminum and copper. The sheet metal 312 made of a material with a high thermal conductance is provided between the common-image-display-panel control board 306 and the common image display panel 310 and, therefore, the sheet metal 312 absorbs heat generated from the common-image-display-panel control board 306, thereby suppressing the influence of the heat generation from the common-image-display-panel control board 306 on the common image display panel 310. Further, although the holding bars 316 are not illustrated in FIG. 6L, the holding bars 316 will be described in detail later with reference to the drawings.

Figure 6M:
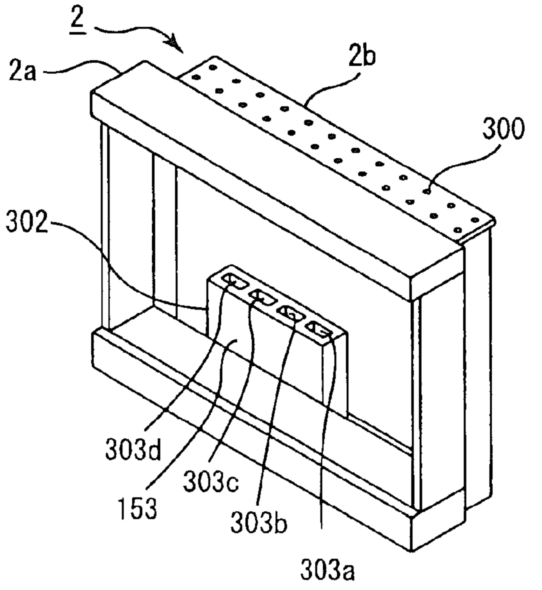
FIG. 6M is a view schematically illustrating the common image display included in the gaming system illustrated in FIG. 2.

FIG. 6M is a view schematically illustrating the common image display included in the gaming system illustrated in FIG. 2.

FIG. 6M is a perspective view schematically illustrating a state where the common image display panel 310 and the sheet metal 312 are removed from the common image display 2. On the back surface of the sheet metal 312 (see FIG. 6L), there is provided the board housing member 302 provided in such a way as to cover the common-image-display-panel control board 306 (see FIG. 6G) which controls the common image display 2. A board-housing-member front surface 153, the surface of the board housing member 302 facing to the common-image-display cabinet 2*a,* is removable. By removing the board-housing-member front surface 153, the common-image-display-panel control board 306 (see FIG. 6G) is exposed.

It is to be noted that the method for mounting the board-housing-member front surface 153 on the board housing member 302 is not particularly limited, so long as the board-housing-member front surface 153 is made removable; for example, the board-housing-member front surface 153 can be mounted on the board housing member 302 using securing members, such as screws.

Figure 6N:
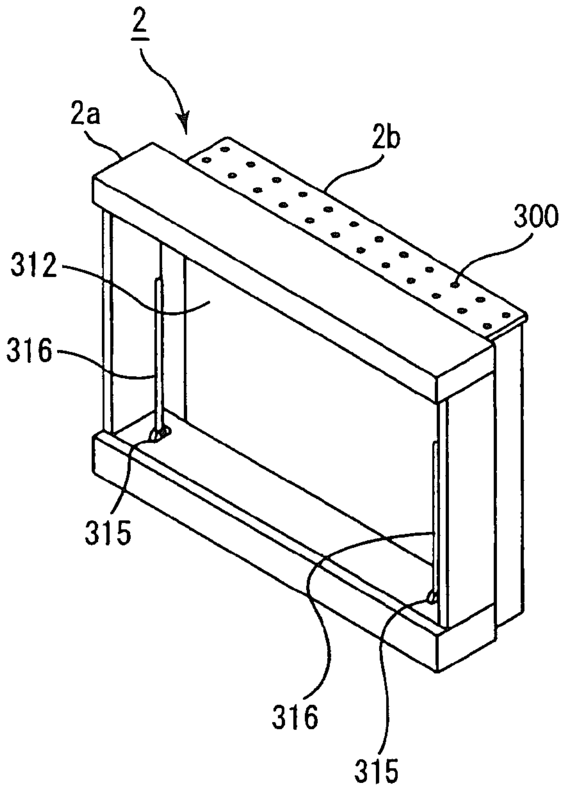
FIG. 6N is a perspective view schematically illustrating a state where the common image display panel is removed from the common image display included in the gaming system illustrated in FIG. 2.

FIG. 6N is a perspective view schematically illustrating a state where the common image display panel is removed from the common image display included in the gaming system illustrated in FIG. 2.

Figure 6O:
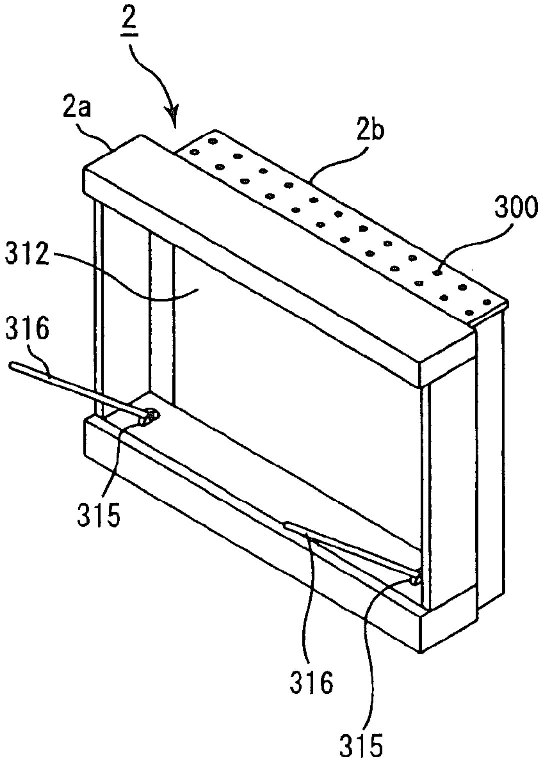
FIG. 6O is a perspective view schematically illustrating a state where the common image display panel is removed from the common image display included in the gaming system illustrated in FIG. 2.

FIG. 6O is a perspective view schematically illustrating a state where the common image display panel is removed from the common image display included in the gaming system illustrated in FIG. 2.

Near ends of the upper surface of the bottom portion of the common-image-display cabinet 2*a,* there are provided respective holding-bar securing members 315. Further, the respective holding-bar securing members 315 allow the holding bars 316 to rotate in the forward direction of the common-image-display cabinet 2*a,* with the first ends of the holding bards 316 as the center, in such a way that the holding bars 316 project forward from the common-image-display cabinet 2*a*.

In FIG. 6N, the holding bars 316 are at rest in a state where the second ends of the holding bars 316 are upwardly oriented. The holding bars 316 are placed on the back surface side of the common image display panel 310 in a state illustrated in FIG. 6N, except during maintenance of the common image display 2.

In FIG. 6O, there is illustrated a state where the holding bars 316 have been rotated with the first ends thereof as the center such that the second ends of the holding bars 316 are oriented in a diagonally forward direction with respect to the common-image-display cabinet 2*a*. As described above, the holding bars 316 are provided rotatably in the forward direction of the common-image-display cabinet 2*a,* with the first ends of the holding bars 316 as the center, in such away that the holding bars 316 project forward from the common-image-display cabinet 2*a*.

Figure 6P:
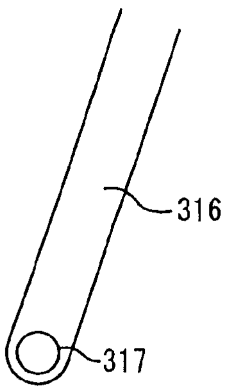
FIG. 6P is a side view schematically illustrating a holding bar included in the common image display illustrated in FIG. 6A.

FIG. 6P is a side view schematically illustrating a holding bar included in the common image display illustrated in FIG. 6A.

The holding bar 316 is provided, on the first end side thereof, with a circular-shaped holding-bar opening 317 which penetrates through the holding bar 316. The holding-bar opening 317 has a diameter larger than the diameter of a securing-member coupling member 318 (see FIG. 6Q).

Figure 6Q:
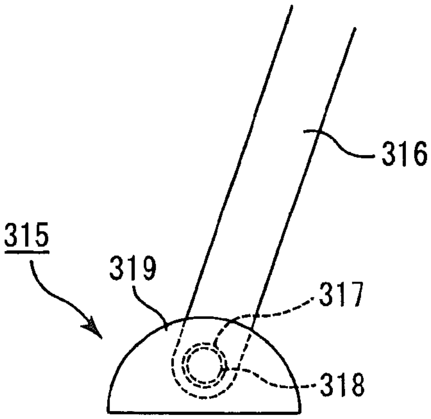
FIG. 6Q is a side view schematically illustrating a holding bar and a holding-bar securing member included in the common image display illustrated in FIG. 6A.

FIG. 6Q is a side view schematically illustrating a holding bar and a holding-bar securing member included in the common image display illustrated in FIG. 6A.

The holding-bar securing member 315 includes two half-circular securing members 319 with half-circular shapes (only one of them is illustrated) and the securing-member coupling member 318 with a circular cylindrical shape which couples substantially-center portions of the two half-circular securing members 319 to each other. The securing-member coupling member 318 is inserted into the holding-bar opening 317, so that the holding bar 316 is provided rotatably with the securing-member coupling member 318 as the center, by the holding-bar securing member 315.

It is to be noted that installation of the holding-bar securing members 315 on the common-image-display cabinet 2*a* can be attained by using securing members such as screws, an adhesive agent, or the like.

Further, the lengths of the holding bars 316 can be properly designed as required.

Figure 6R:
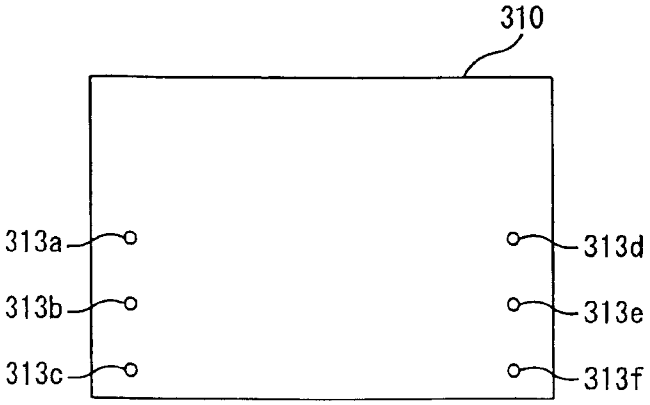
FIG. 6R is a view schematically illustrating the back surface of the common image display panel included in the common image display illustrated in FIG. 6A.

FIG. 6R is a view schematically illustrating the back surface of the common image display panel included in the common image display illustrated in FIG. 6A.

In the back surface of the common image display panel 310, there are provided a plurality of engagement depressed portions 313 (an engagement depressed portion 313*a,* an engagement depressed portion 313*b,* an engagement depressed portion 313*c,* an engagement depressed portion 313*d,* an engagement depressed portion 313*e,* and an engagement depressed portion 313*f*) which are depressed portions with circular cylindrical shapes. The second ends of the holding bars 316 are engaged with the engagement depressed portions 313, so that the common image display panel 310 is held at rest, after being rotated upwardly or downwardly with respect to the floor surface with the hinge 314 as a shaft.

FIG. 7 is a perspective view schematically illustrating a state where the common image display, the supporting members and the pedestal according to an embodiment are being coupled to one another.

The pedestal upper surface opening 201*a* provided in the installation surface 204 included in the pedestal 6 receives the supporting-member opening protrusion 150*d* provided on the lower end side of the supporting member 8*a,* which causes the supporting member 8*a* to be secured to the pedestal 6 and also causes the hollow space included in the pedestal 6 to be communicated with the flow channel included in the supporting member 8*a*. It is to be noted that the flow channel included in the supporting member 8*a* is communicated with openings respectively provided in the supporting-member opening protrusions 150*b* and 150*d* provided at the respective ends of the supporting member 8*a* (not illustrated). Similarly, the pedestal upper surface opening 201*b* provided in the installation surface 204 receives the supporting-member opening protrusion 150*c* provided on the lower end side of the supporting member 8*b,* which causes the supporting member 8*b* to be secured to the pedestal 6 and also causes the hollow space included in the pedestal 6 to be communicated with the flow channel included in the supporting member 8*b*. It is to be noted that the flow channel included in the supporting member 8*b* is communicated with openings respectively provided in the supporting-member opening protrusions 150*a* and 150*c* provided at the respective ends of the supporting member 8*b* (not illustrated).

The common-image-display bottom opening 301*a* provided in the bottom surface of the common-image-display back surface side cabinet 2*b* receives the supporting member 8*a* and, the board-housing-member bottom opening 305 provided at the bottom portion of the board housing member 302 receives the supporting-member opening protrusion 150*b* provided on the upper end side of the supporting member 8*a,* which causes the supporting member 8*a* to support the board housing member 302 included in the common image display 2 and also causes the space within the board housing member 302 to be communicated with the flow channel included in the supporting member 8*a*. It is to be noted that the common-image-display bottom opening 301*a* has an approximately same size as that of the supporting member 8. Meanwhile, the common-image-display bottom opening 301*b* provided in the bottom surface of the common-image-display back surface side cabinet 2*b* receives the supporting-member opening protrusion 150*a* provided on the upper end side of the supporting member 8*b,* which causes the supporting member 8*b* to support the common image display 2 and also causes the internal space included in the common-image-display back surface side cabinet 2*b* to be communicated with the flow channel included in the supporting member 8*b*.

The air flowed into the pedestal bottom surface openings 202 (see FIG. 4B) which are provided in the pedestal 6 and communicated with external air is transferred upwardly within the flow channel included in the supporting member 8*a* by the fan 155 (see FIG. 5C) provided within the flow channel included in the supporting member 8*a,* flows into the space within the board housing member 302, cools the heat-generating common-image-display-panel control board 306 (see FIG. 6G), flows out through the board-housing-member upper openings 303 provided at the upper portion of the board housing member 302, and flows out through the plurality of common-image-display upper openings 300 (see FIG. 6A) provided in the upper surface of the common-image-display back surface side cabinet 2*b*. Further, the air flowed into the space within the board housing member 302 is flowed into the CPU housing member 307 through the CPU-housing-member opening 309*a* by the CPU fan 308 provided within the CPU housing member 307, and cools the heat-generating CPU. Thereafter, the air is ejected therefrom through the CPU-housing-member opening 309*b*, is ejected through the board-housing-member upper openings 303 provided at the upper portion of the board housing member 302 and then is ejected through the plurality of common-image-display upper openings 300 (see FIG. 6A) provided in the upper surface of the common-image-display back surface side cabinet 2*b*.

Further, the air flowed into the pedestal bottom surface openings 202 (see FIG. 4B) which are provided in the pedestal 6 and communicated with external air is transferred upwardly through the flow channel included in the supporting member 8*b* by the fan 155 (see FIG. 5C) provided within the flow channel included in the supporting member 8*b*, flows into the internal space included in the common-image-display back surface side cabinet 2*b*, cools the board housing member 302 from the outside thereof, and flows out through the plurality of common-image-display upper openings 300 (see FIG. 6A) provided in the upper surface of the common-image-display back surface side cabinet 2*b*.

It is to be noted that, when the common image display 2, the supporting members 8 and the pedestal 6 are coupled to one another, it is possible to use securing members such as screws, an adhesive agent or the like. Further, the thickness of the installation surface 204, the thickness of the bottom surface of the common-image-display back surface side cabinet 2*b*, and the length of the supporting-member opening protrusions 150 can be properly designed as required.

In the present embodiment, there has been described a case where the pedestal upper surface openings 201 (the pedestal upper surface opening 201*a* and the pedestal upper surface opening 201*b*), the common-image-display bottom opening 301*b* and the board-housing-member bottom opening 305 have rectangular shapes. However, the shapes of the pedestal upper surface openings, the common-image-display bottom opening and the board-housing-member bottom opening are not particularly limited, so long as the shapes conform to the shapes of the supporting-member opening protrusions 150. For example, when the supporting-member opening protrusions have circular cylindrical shapes, the pedestal upper surface openings, the common-image-display bottom opening and the board-housing-member bottom opening may have circular shapes.

FIG. 8 is a perspective view schematically showing a slot machine according to an embodiment of the present invention.

In the slot machine 10, a coin, a bill, or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

The slot machine 10 comprises a cabinet 11, a top box 12 installed on the upper side of the cabinet 11, and a main door 13 provided at the front face of the cabinet 11.

On the main door 13, a lower image display panel 16 as a display is provided.

The lower image display panel 16 includes a transparent liquid crystal panel, and displays 15 display blocks 150 in 5 columns and 3 rows. A single symbol is displayed in each display block 150.

Further, a number-of-credits display portion 31 and a number-of-payouts display portion 32 are provided in the lower image display panel 16. The number-of-credits display portion 31 displays an image indicative of the number of coins being credited. The number-of-payouts display portion 32 displays an image indicative of the number of coins to be paid out.

Moreover, although not shown, a touch panel 69 is provided at the front face of the lower image display panel 16. A player can operate the touch panel 69 to input a variety of commands.

Below the lower image display panel 16, there are provided a control panel 20 including a plurality of buttons 23 to 27 and 110A to 110C with each of which a command according to game progress is inputted by the player, a coin receiving slot 21 through which a coin is accepted into the cabinet 11, and a bill validator 22.

The control panel 20 is provided with a spin button 23, a change button 24, a CASHOUT button 25, a 1-BET button 26 and a maximum BET button 27. The spin button 23 is used for inputting a command to start scroll of the symbols. The change button 24 is used for making a request of staff in the recreation facility for exchange. The CASHOUT button 25 is used for inputting a command to pay out credited coins to a coin tray 18.

The 1-BET button 26 is used for inputting a command to bet one coin on a game out of credited coins. The maximum BET button 27 is used for inputting a command to bet the maximum number of coins that can be bet on one game (50 coins in the present embodiment) out of credited coins.

A right selection button 110A, a center selection button 110B and a left selection button 110C are used for selecting a right card, a center card and a left card, respectively, during a common game.

The bill validator 22 not only discriminates a regular bill from a false bill, but also accepts the regular bill into the cabinet 11. It is to be noted that the bill validator 22 may be configured so as to be capable of reading a later-described ticket 39 with a barcode. At the lower front of the main door 13, namely, below the control panel 20, there is provided a belly glass 34 on which a character or the like of the slot machine 10 is drawn.

Also, speakers 29 are provided on either side of the top box 12. Further, on the front face of the top box 12, there are provided a ticket printer 35, a card reader 36, a data display 37, and a key pad 38. The ticket printer 35 prints on a ticket a barcode as coded data of the number of credits, a date, an identification number of the slot machine 10, and the like, and outputs the ticket as the ticket 39 with a barcode. The player can make another slot machine read the ticket 39 with a barcode to play a game thereon, or exchange the ticket 39 with a barcode with a bill or the like at a predetermined place in the recreation facility (e.g. a cashier in a casino).

The card reader 36 reads data from a smart card and writes data into the smart card. The smart card is a card owned by the player, and for example, data for identifying the player and data concerning a history of games played by the player are stored therein. Data corresponding to a coin, a bill or a credit may be stored in the smart card. Further, a magnetic stripe card maybe adopted in place of the smart card. The data display 37 includes a fluorescent display and the like, and displays, for example, data read by the card reader 36 or data inputted by the player via the key pad 38. The key pad 38 is used for inputting a command and data concerning issuing of a ticket, and the like.

FIG. 9 is a view illustrating an exemplary image displayed to the lower image display panel.

FIG. 9 illustrates an image which is displayed when symbols are rearranged during the execution of normal games.

Symbols are scrolled along the respective columns of the display blocks 150 and then rearranged. Based on the types and the numbers of the symbols displayed in the display blocks 150 at this time, payout of coins is conducted.

Further, in the present embodiment, there has been described a case where 15 symbols in total are displayed along 3 rows and 5 columns. However, display of symbols according to the present invention is not limited to display along 3 rows and 5 columns. Further, while, in the present embodiment, there has been described a case where symbols are scrolled along the respective columns, symbols may be scroll-displayed in each block.

Further, although not illustrated, various types of images relating to effects, in addition to images as described above, are displayed to the lower image display panel 16.

FIG. 10 is a view illustrating the symbols to be displayed in the respective display blocks and the code Nos. of the respective symbols.

As illustrated in FIG. 10, arrays of 22 symbols having code Nos. of "00" to "21" in total are scrolled in the respective display blocks 150. Each of the arrays of symbols is constituted by a combination of symbols of "JACKPOT 7", "BLUE 7", "BELL", "CHERRY", "STRAWBERRY", "PLUM", "ORANGE" and "APPLE". These symbols are all scatter symbols and, based on the number of symbols displayed in the display blocks 150 at the time of rearrangement, payout of coins is conducted.

FIG. 11 is a block diagram showing the internal configuration of the slot machine shown in FIG. 8.

A gaming board 50 is provided with a CPU (Central Processing Unit) 51, a ROM 55, and a boot ROM 52 which are interconnected to one another by an internal bus, a card slot 53S corresponding to a memory card 53, and an IC socket 54S corresponding to a GAL (Generic Array Logic) 54.

The memory card 53 includes a nonvolatile memory such as CompactFlash (registered trademark), and stores a game program. The game program includes a symbol determination program. The symbol determination program is a program for determining symbols (code Nos. corresponding to the symbols) to be rearranged to the display blocks 150.

Further, the card slot 53S is configured so as to allow the memory card 53 to be inserted thereinto or removed therefrom, and is connected to the mother board 40 by an IDE bus. Therefore, the type and contents of a game played on the slot machine 10 can be changed by removing the memory card 53 from the card slot 53S, writing another game program into the memory card 53, and inserting the memory card 53 into the card slot 53S. The game program includes a program according to progress of the game. Further, the game program includes image data and sound data to be outputted during the game.

The CPU 51, the ROM 55 and the boot ROM 52 interconnected to one another by an internal bus are connected to the mother board 40 through the PCI bus. The PCI bus not only conducts signal transmission between the mother board 40 and the gaming board 50, but also supplies power from the mother board 40 to the gaming board 50.

The mother board 40 is configured using a commercially available general-purpose mother board (a print wiring board on which fundamental components of a personal computer are mounted), and provided with a main CPU 41, a ROM (Read Only Memory) 42, a RAM (Random Access Memory) 43, and a communication interface 44. The mother board 40 corresponds to the controller of the present invention.

The ROM 42 is comprised of a memory device such as a flash memory, and stores a program such as a BIOS (Basic Input/Output System) executed by the main CPU 41, and permanent data. When the BIOS is executed by the main CPU 41, processing for initializing a predetermined peripheral device is conducted, concurrently with start of processing for loading the game program stored in the memory card 53 via the gaming board 50. It is to be noted that, in the present invention, the ROM 42 may or may not be data rewritable one.

The RAM 43 stores data and a program to be used at the time of operation of the main CPU 41. Further, the RAM 43 is capable of storing a game program.

Further, the RAM 43 stores data such as a normal-game-start cancel flag, the symbol determination program, code Nos. of symbol arrays, the number of credits, the number of inserted coins and the number of payouts in one game, and the like.

Moreover, the mother board 40 is connected with a later-described body PCB (Printed Circuit Board) 60 and a door PCB 80 through respective USBs. Further, the mother board 40 is connected with a power supply unit 45 and a communication interface 44.

The body PCB 60 and the door PCB 80 are connected with an instrument and a device that generate an input signal to be inputted into the main CPU 41 and an instrument and a device operations of which are controlled by a control signal outputted from the main CPU 41. The main CPU 41 executes the game program stored in the RAM 43 based on the input signal inputted into the main CPU 41, and thereby executes the predetermined arithmetic processing, stores the result thereof into the RAM 43, or transmits a control signal to each instrument and device as processing for controlling each instrument and device.

The body PCB 60 is connected with a hopper 66, a coin detecting portion 67, a graphic board 68, the speakers 29, the touch panel 69, the bill validator 22, the ticket printer 35, the card reader 36, a key switch 38S and the data display 37.

The hopper 66 is installed inside the cabinet 11, and pays out a predetermined number of coins from the coin payout exit 19 to the coin tray 18, based on the control signal outputted from the main CPU 41. The coin detecting portion 67 is provided inside the coin payout exit 19, and outputs an input signal to the main CPU 41 in the case of detecting payout of the predetermined number of coins from the coin payout exit 19.

The graphic board 68 controls image display to the lower image display panel 16, based on the control signal outputted from the main CPU 41. To each of the display blocks 150 of the lower image display panel 16, a scrolled or stopped symbol is displayed. The number of credits stored in the RAM 43 is displayed to a number-of-credits display portion 31 of the lower image display panel 16. Further, the number of coin-outs is displayed to a number-of-payouts display portion 32 of the lower image display panel 16.

The graphic board 68 comprises a VDP (Video Display Processor) generating image data based on the control signal outputted from the main CPU 41, a video RAM temporarily storing image data generated by the VDP, and the like. It is to be noted that image data used in generation of the image data by the VDP is included in the game program read from the memory card 53 and stored into the RAM 43.

The bill validator 22 not only discriminates a regular bill from a false bill, but also accepts the regular bill into the cabinet 11. Upon acceptance of the regular bill, the bill validator 22 outputs an input signal to the main CPU 41 based on a face amount of the bill. The main CPU 41 stores in the PAM 43 the number of credits corresponding to the face amount of the bill transmitted with the input signal.

Based on the control signal outputted from the main CPU 41, the ticket printer 35 prints on a ticket a barcode as coded data of the number of credits stored in the PAM 43, a date, and an identification number of the slot machine 10, and the like, and outputs the ticket as the ticket 39 with a barcode. The card reader 36 reads data from the smart card and transmits the read data to the main CPU 41, and writes data onto the smart card based on the control signal from the main CPU 41. The key switch 38S is provided on the key pad 38, and outputs a predetermined input signal to the main CPU 41 when the key pad 38 is operated by the player. The data display 37 displays data read by the card reader 36 and data inputted by the player via the key pad 38, based on the control signal outputted from the main CPU 41.

The door PCB 80 is connected with a control panel 20, a reverter 21S, a coin counter 21C, and a cold cathode tube 81. The control panel 20 is provided with a spin switch 23S corresponding to the spin button 23, a change switch 24S corresponding to the change button 24, a CASHOUT switch 25S corresponding to the CASHOUT button 25, a 1-BET switch 26S corresponding to the 1-BET button 26, the maximum BET switch 27S corresponding to the maximum BET button 27, a right selection switch 110S corresponding to the right selection button 110A, a center selection switch 110BS corresponding to the center selection button 110C, and a left selection switch 110CS corresponding to the left selection button 110C. Each of the switches 23S to 27S and 110AS to 110CS outputs an input signal to the main CPU 41 when each of the buttons 23 to 27 and 110A to 110C corresponding thereto is operated by the player.

The coin counter 21C is provided inside the coin receiving slot 21, and discriminates a regular coin from a false coin inserted into the coin receiving slot 21 by the player. Coins other than the regular coin are discharged from the coin payout exit 19. Further, the coin counter 21C outputs an input signal to the main CPU 41 in detection of the regular coin.

The reverter 21S operates based on the control signal outputted from the main CPU 41, and distributes a coin recognized as the regular coin by the coin counter 21C into a cash box (not shown) or the hopper 66, which are disposed in the slot machine 10. Namely, when the hopper 66 is filled with coins, the regular coin is distributed into the cash box by the reverter 21S. On the other hand, when the hopper 66 is not filled with coins, the regular coin is distributed into the hopper 66. The cold cathode tube 81 functions as a back light installed on the rear face side of the lower image display panel 16, and is lit up based on the control signal outputted from the main CPU 41.

FIG. 12 is a block diagram illustrating an internal configuration of the control device provided in the gaming system illustrated in FIG. 2.

The control device 200 is provided with the CPU 501 as a processor, a ROM 502, a RAM 503, a communication interface 504, a hard disk drive 505, and a timer 506. The communication interface 504 is connected with the slot machines 10, the common image display 2, and the common compact image displays 3 (the common compact image display 3*a*, the common compact image display 3*b*, the common compact image display 3*c*, and the common compact image display 3*d*), via communication cables.

The ROM 502 stores: a system program for controlling operations of the control device 200; permanent data; and the like.

The ROM 502 stores data indicative of a predetermined value and data indicative of a predetermined time.

The ROM 502 stores dot data for use in forming images to be displayed to the common image display 2, and dot data for use in displaying card images 313 and card images 316.

The RAM 503 temporarily stores data such as data received from each of the slot machines 10, and data on a calculation result.

The RAM 503 stores a cumulative number T of games, a cumulative value S, a carry-over value R and a deposit value U.

Further, the CPU 501 controls display of images to the common compact image displays 3. To the common compact image displays 3, for example, images showing introduction of game contents and explanation of a game rule are displayed under control of the CPU 501.

FIG. 13 is a flowchart showing a procedure of activation processing executed in the slot machine. This activation processing is the processing conducted by the mother board 40 and the gaming board 50. It should be noted that the memory card 53 is inserted into the card slot 53S in the gaming board 50, and the GAL 54 is mounted onto the IC socket 54S.

First, when a power switch is turned on (power is turned on) in the power supply unit 45, the mother board 40 and the gaming board 50 are activated (steps S1-1, S2-1). In activation of the mother board 40 and the gaming board 50, different processing is individually executed in parallel. Namely, in the gaming board 50, the CPU 51 reads the auxiliary authentication program stored in the boot ROM 52, and conducts auxiliary authentication according to the read auxiliary authentication program, to previously check and prove that the authentication program is not falsified before loading the program to the mother board 40 (step S2-2). Meanwhile, in the mother board 40, the main CPU 41 executes the BIOS stored in the ROM 42, and expands compressed data which is incorporated in the BIOS into the RAM 43 (step S1-2). The main CPU 41 then executes the BIOS expanded into the RAM 43 to diagnose and initialize a variety of peripheral devices (step S1-3). The processing of step S1-3 will be specifically described later with reference to drawings.

Since the ROM 55 of the gaming board 50 is connected to the main CPU 41 via the PCI bus, the main CPU 41 reads the authentication program stored in the ROM 55, and stores the read authentication program into the RAM 43 (step S1-4). At this time, according to the standard BIOS function of BIOS, the main CPU 41 takes a checksum by ADDSUM system (normal checking system) and stores the authentication program into the RAM 43, while conducting processing for confirming whether or not the storage is certainly conducted.

Next, after confirming what is connected to the IDE bus, the main CPU 41 accesses, via the IDE bus, the memory card 53 inserted in the card slot 53S, to read a game program and a game system program from the memory card 53. In this case, the main CPU 41 reads data constituting the game program and the game system program by 4 bytes at a time. Subsequently, the main CPU 41 conducts authentication to check and prove that the read game program and game system program have not been falsified, following the authentication program stored in the RAM 43 (step S1-5). When this authentication processing is normally completed, the main CPU 41 writes and stores the game program and the game system program, which have been the authentication targets (which have been authenticated), into the RAM 43 (step S1-6). Next, the main CPU 41 accesses via the PCI bus the GAL 54 mounted on the IC socket 54S, reads payout ratio setting data from the GAL 54, and writes and stores the data into the RAM 43 (step S1-7). Subsequently, the main CPU 41 conducts processing for reading country identification information stored in the ROM 55 of the gaming board 50 via the PCI bus, and writes and stores the read country identification information into the RAM 43 (step S1-8).

After conducting the above-mentioned processing, the main CPU 41 sequentially reads and executes the game program and the game system program, thereby executes the main processing.

FIG. 14 is a view showing peripheral-device initialization processing executed in the slot machines.

First, the main CPU 41 diagnoses and initializes the display (step S3-2). In this processing, the main CPU 41 transmits a request signal to the graphic board 68. Then, the main CPU 41 determines whether or not to have received a predetermined response signal and conducts clearance of a predetermined storage area, and the like.

Next, the main CPU 41 diagnoses and initializes various types of input devices (step S3-3). In this processing, the main CPU 41 transmits request signals to the input devices such as the spin switch 23S, the change switch 24S, the CASHOUT switch 25S, the 1-BET switch 26S, the maximum BET switch 27S, the right selection switch 110AS, the center selection switch 110BS, the left selection switch 110CS and the touch panel 11, and then determines whether or not to have received predetermined response signals.

Subsequently, the main CPU 41 diagnoses and initializes other peripheral devices connected to the main CPU 41 (step S3-4). Then the present subroutine is terminated.

FIG. 15 is a flowchart illustrating a subroutine of activation processing conducted in the control device.

First, when the power switch is turned on (the power is turned on) in the power supply unit, a mother board (not shown) is activated (step S4-1).

In the mother board, the CPU 501 executes a BIOS stored in the ROM 502 so as to expand compressed data incorporated in the BIOS into the RAM 503 (step S4-2). Then, the CPU 501 executes the BIOS expanded into the RAM 503, and then, diagnoses and initializes various types of peripheral devices such as the common image display 2 and the common compact image displays 3 (step S4-3).

Next, the CPU 501 executes initialization processing of each slot machine. In this processing, the CPU 501 establishes a network connection between the control device 200 and each slot machine 10, and diagnoses if the network functions properly.

After the above-described processing, the CPU 501 controls progress of the game executed in the plurality of the slot machines 10 by reading and executing a game control program.

FIG. 16 is a flowchart illustrating a subroutine of main processing executed in the slot machines.

At first, the main CPU 41 executes normal-game execution processing (step S10). In this processing, after coins are BET, the main CPU 41 rearranges symbols in the lower image display panel 16 by being triggered by turn-on of the spin button 23, and pays out coins when the main CPU 41 determines that a prize has been established. The normal-game execution processing will be described in more detail later with reference to the drawings. The main CPU 41 transmits a game-executed signal to the control device 200 (step S11).

The main CPU 41 determines whether or not a normal-game-start cancel flag is set (step S12). When the main CPU 41 determines that a normal-game-start cancel flag is not set, the main CPU 41 returns the processing to step S10. On the other hand, when the main CPU 41 determines that a normal-game-start cancel flag is set, the main CPU 41 shifts the processing to step S13.

The main CPU 41 determines whether or not to have received a common-game start signal from the control device 200 (step S13). When the main CPU 41 determines to have not received a common-game start signal from the control device 200, the main CPU 41 returns the processing to step S13. On the other hand, when the main CPU 41 determines to have received a common-game start signal from the control device 200, the main CPU 41 shifts the processing to step S14.

The main CPU 41 executes common-game execution processing (step S14). The common game is a game which is simultaneously executed in all the slot machines 10 connected to the control device 200 through the communication cables. The common-game execution processing will be described in more detail later with reference to the drawings.

The main CPU 41 clears the normal-game-start cancel flag (step S15). After the processing of step 15 is executed, the processing is returned to step S10.

FIG. 17 is a flowchart illustrating a subroutine of the normal-game execution processing executed in the slot machines.

The processing is processing called and executed in step S10 of the subroutine illustrated in FIG. 16.

First, the main CPU 41 determines whether or not a coin has been BET (step S100). In this processing, the main CPU 41 determines whether or not to have received an input signal that is outputted from the 1-BET switch 26S when the 1-BET button 26 is operated, or an input signal that is outputted from a maximum BET switch 27S when the maximum BET button 27 is operated. When the main CPU 41 determines that the coin has not been BET, the processing is returned to step S100.

On the other hand, when determining that the coin has been BET in step S100, the main CPU 41 conducts processing for making a subtraction from the number of credits stored in the RAM 43 according to the number of coins BET (step S101). It is to be noted that, when the number of coins BET is larger than the number of credits stored in the RAM 43, the main CPU 41 does not conduct the processing for making a subtraction from the number of credits stored in the RAM 43, and the processing is returned to step S100. Further, when the number of coins BET exceeds the upper limit of the number of coins that can be BET in one game (50 coins in the present embodiment), the main CPU 41 does not conduct the processing for making a subtraction from the number of credits stored in the RAM 43, and the processing is proceeded to step S102.

Next, the main CPU 41 determines in step S102 whether or not the spin button 23 has been turned ON. In this processing, the main CPU 41 determines whether or not to have received an input signal that is outputted from the spin switch 23S when the spin button 23 is pressed.

When the main CPU 41 determines that the spin button 23 has not been turned ON, the processing is returned to step S100.

It is to be noted that, when the spin button 23 is not turned ON (e.g. when the spin button 23 is not turned ON and a command to end the game is inputted), the main CPU 41 cancels a subtraction result in step S101.

Meanwhile, when determining in step S102 that the spin button 23 has been turned ON, the main CPU 41 shifts the processing to step S103.

Next, in step S103, the main CPU 41 executes symbol determination processing. In this symbol determination processing, the main CPU 41 executes the symbol determination program stored in the RAM 43 to determine the code Nos. in stopping of the symbols. It is to be noted that the processing in step S103 will be described in more detail later with reference to the drawings.

Next, in step S104, the main CPU 41 executes scroll-display control processing.

This processing is processing for controlling the display in such a way as to rearrange the symbols determined in step S103, after start of scrolling of symbols.

In step S105, the main CPU 41 determines whether or not a prize has been established. When the main CPU 41 determines that a prize has been established, the main CPU 41 pays out coins, in step S106, based on the number of inserted coins and the types and the numbers of the symbols displayed in the display blocks 150. Here, the case where a prize has been established is a case where three or more symbols of the same type have been displayed in the display blocks 150.

When the main CPU 41 determines in step S105 that no prize has been established or when the processing in step S106 has been executed, the main CPU 41 determines whether or not to have received a game cancel signal from the control device 200 (step S107). When the main CPU 41 determines to have received no game cancel signal, the main CPU 41 ends the present subroutine. On the other hand, when the main CPU 41 determines to have received a game cancel signal, the main CPU 41 sets a normal-game-start cancel flag (step S108). Then, the main CPU 41 transmits a normal-game-ended signal to the control device 200 (step S109)

FIG. 18 is a flowchart illustrating a subroutine of the symbol determination processing executed in the slot machines.

This is the processing called and executed in step S103 of the subroutine illustrated in FIG. 17.

The processing is processing conducted by the main CPU 41 executing the symbol determination program stored in the RAM 43.

First, the main CPU 41 executes a random number generation program included in the symbol determination program, to select random numbers corresponding to the respective symbol arrays, out of the numbers falling in the numeric range of 0 to 255 (step S200). In the present embodiment, the case of generating random numbers on the program (the case of using a so-called software random number) is described. However, in the present invention, a random number generator may be provided and random numbers may be extracted from the random number generator (a so-called hardware random number may be used).

Next, the main CPU 41 determines code Nos. (see FIG. 10) for the respective arrays of symbols, based on the selected five random numbers (step S201). The code Nos. for the arrays of symbols correspond to the code Nos. of symbols to be rearranged in the display blocks 150 in the second row, out of the display blocks 150 placed in the three rows. The main CPU 41 determines a prize by determining the code Nos. for the respective arrays of symbols. Then, the main CPU 41 stores in the RAM 43 the determined code Nos. for the respective arrays of symbols.

Here, there will be described prizes based on symbols according to the present embodiment.

FIG. 19 is a view illustrating the relationship between the plurality of types of prizes and numbers of payouts.

When three or more symbols of any type are stop-displayed in the display blocks 150, coins in number illustrated in FIG. 19 are paid out.

For example, when three symbols of "CHERRY" are stop-displayed in the display blocks 150, two coins are paid out. When four symbols of "CHERRY" are stop-displayed in the display blocks 150, four coins are paid out. Further, when six or more symbols of "CHERRY" are stop-displayed in the display blocks 150, $2\times(n-2)$ coins are paid out, wherein n is the number of symbols of "CHERRY" stop-displayed in the display blocks 150. However, for any type of the symbols, when three or more symbols are not stop-displayed in the display blocks 150, the game results in losing; thus, payout of coins is not performed.

FIG. 20A is a flowchart illustrating a subroutine of game execution processing which is executed in the control device.

At first, the CPU 501 determines whether or not to have received a game-executed signal from any of the slot machines 10 (step S300). When the CPU 501 determines to have received no game-executed signal, the CPU 501 returns the processing to step S300. On the other hand, when the CPU 501 determines to have received a game-executed signal, the CPU 501 shifts the processing to step S301.

The CPU 501 adds 1 to the cumulative number T of games stored in the RAM 503 and stores the numerical value resulted from the addition, as a new cumulative number T of games, in the RAM 503 (step S301).

The CPU 501 multiplies the cumulative number T of games stored in the RAM 503 by 5 and stores the resultant value, as a cumulative value S, in the RAM 503 (step S302). The CPU 501 adds the carry-over value R stored in the RAM 503 to the cumulative value S stored in the RAM 503 in step S302 and stores the value resulted from the addition as a deposit value U in the RAM 503 (step S303). Then, the CPU 501 displays to the common image display 2 the deposit value U stored in the RAM 503 in step S303 (step S304). FIG. 21 illustrates an exemplary display screen displayed to the common image display 2.

FIG. 21 is a view illustrating an exemplary display screen displayed to the common image display included in the gaming system illustrated in FIG. 2.

As a result of the processing in step S304, there is displayed to the common image display 2 a deposit-value display image 312 indicating that the current deposit value U is 325 coins.

Returning to FIG. 20B, the CPU 501 determines whether or not the cumulative number T of games has reached a predetermined value (step S305). When the CPU 501 determines that the cumulative number T of games has not reached the predetermined value, the CPU 501 ends the present subroutine. On the other hand, when the CPU 501 determines that the cumulative number T of games has reached the predetermined value, the CPU 501 shifts the processing to step 5306.

The CPU 501 transmits a game cancel signal to each slot machine 10 (step S306). The CPU 501 receives a normal-game-ended signal from each slot machine 10 (step S307)

The CPU 501 determines whether or not to have received normal-game-ended signals from all the slot machines 10 (step S308). When the CPU 501 determines to have not received normal-game-ended signals from all the slot machines 10, the CPU 501 returns the processing to step S307. On the other hand, when the CPU 501 determines to have received normal-game-ended signals from all the slot machines 10, the CPU 501 shifts the processing to step S309.

The CPU 501 transmits a common-game start signal to each slot machine 10 (step S309). The CPU 501 executes common-game execution processing (step S310). The common game is a game which is simultaneously executed in all the slot machines 10 connected to the control device 200 through the communication cables. The common-game execution processing will be described in more detail later with reference to the drawings.

While, in the present embodiment, there has been described a case where the cumulative value S is obtained by multiplying the cumulative number T of games by 5, the numerical value by which the cumulative number T of games is multiplied is not particularly limited and may be, for example, 10. Also, the game-executed signal transmitted from each slot machine 10 may include the amount of betted game media, and the control device 200 may count the cumulative value of game media based on the amount of game media transmitted from each slot machine 10 and determine a certain proportion of the counted cumulative value of game media as the cumulative value S.

FIG. 22 is a flowchart illustrating a subroutine of the common-game execution processing which is executed in the slot machines.

This processing is processing which is called and executed in step S14 of the subroutine illustrated in FIG. 16.

At first, the main CPU 41 determines whether or not any of the right selection button 110A, the center selection button 110B and the left selection button 110C has been pressed (step S400). In this processing, the main CPU 41 determines whether or not to have received an input signal outputted from the right selection switch 110AS when the right selection button 110A is pressed, an input signal outputted from the center selection switch 110BS when the center selection button 110B is pressed, or an input signal outputted from the left selection switch 110CS when the left selection button 110C is pressed. When the main CPU 41 determines that any of the buttons has not been pressed, the main CPU 41 shifts the processing to step S401.

The main CPU 41 determines whether or not to have received a common-game end signal (step S401). When the main CPU 41 determines to have received no common-game end signal, the main CPU 41 returns the processing to step S400. On the other hand, when the main CPU 41 determines to have received a common-game end signal, the main CPU 41 ends the present subroutine.

When the main CPU 41 determines in step S400 that a button has been pressed, the main CPU 41 shifts the processing to step S402. The main CPU 41 transmits a card selection signal to the control device 200 (step S402). The card selection signal includes information about the type of the pressed selection button 110. Namely, when the right selection button 110A has been pressed, the card selection signal includes information showing that the pressed selection button 110 is the right selection button 110A.

The main CPU 41 determines whether or not to have received a payout signal (step S403). When the main CPU 41 determines to have received no payout signal, the main CPU 41 shifts the processing to step S405.

The main CPU 41 determines whether or not to have received a common-game end signal (step S405). When the main CPU 41 determines to have received no common-game end signal, the main CPU 41 returns the processing to step S403. On the other hand, when the main CPU 41 determines to have received a common-game end signal, the main CPU 41 ends the present subroutine.

When the main CPU 41 determines in step S403 to have received a payout signal, the main CPU 41 shifts the processing to step S404. The main CPU 41 pays out coins based on the payout signal (step S404).

FIG. 23A is a flowchart illustrating a subroutine of the common-game execution processing executed in the control device.

This processing is processing called and executed in step S310 in the subroutine illustrated in FIG. 20B.

At first, in step S500, the CPU 501 displays card images face down to the common image display 2. FIG. 24A illustrates exemplary card images displayed to the common image display 2.

FIG. 24A is a view illustrating an exemplary display screen displayed to the common image display included in the gaming system illustrated in FIG. 2.

In FIG. 24A, there are displayed a card image 313A, a card image 313B, and a card image 313C. The player is enabled to select one of the card images 313 displayed to the common image display 2, by pressing any of the right selection button 110A, the center selection button 110B and the left selection button 110C. Namely, when the right selection button 110A is pressed, the card image 313C is selected. When the center selection button 110B is pressed, the card image 313B is selected. When the left selection button 110C is pressed, the card image 313A is selected.

Returning to FIG. 23A, the CPU 501 accepts a card selection input, in step S501. In this processing, the CPU 501 accepts a card selection signal from each slot machine 10. Further, the CPU 501 starts measurement of the elapsed time, with a timer 506.

Next, the CPU 501 determines whether or not the elapsed time measured by the timer 506 has reached the predetermined time (step S502). When the CPU 501 determines that the elapsed time has not reached the predetermined time, the CPU 501 returns the processing to step S501. On the other hand, when the CPU 501 determines that the elapsed time has reached the predetermined time, the CPU 501 shifts the processing to step S503.

The CPU 501 displays card images face up to the common image display 2 (step S503). FIG. 24B illustrates exemplary card images displayed to the common image display 2.

FIG. 24B is a view illustrating an exemplary display screen displayed to the common image display.

In FIG. 24B, there are displayed a card image 316A, a card image 316B, and a card image 316C. In the card image 316B, a circular pattern is displayed. The player who has selected the card image 316B having the circular pattern displayed therein wins.

Returning to FIG. 23B, the CPU 501 determines whether or not there is a slot machine 10 in which winning has occurred (step S504). In this processing, the CPU 501 determines whether or not there is a slot machine 10 in which winning has occurred, based on the card selection signals received from the respective slot machines 10 and on the card images 316 displayed to the common image display 2 in step S503. When the CPU 501 determines that there is no slot machine 10 in which winning has occurred, the CPU 501 returns the processing to step S505.

The CPU 501 updates the carry-over value R stored in the RAM 503 (step S505). In this processing, the CPU 501 adds the carry-over value R stored in the RAM 503 to the cumulative value S stored in the RAM 503, and stores the value resulted from the addition as a new carry-over value R, in the RAM 503.

When the CPU 501 determines in step S504 that there is a slot machine 10 in which winning has occurred, the CPU 501 shifts the processing to step S506. The CPU 501 transmits a payout signal to the slot machine 10 in which winning has occurred (step S506). The payout signal includes information about the value of a payout to be offered in the slot machine 10. It is to be noted that, when winning has occurred in a plurality of slot machines 10, the deposit value U stored in the RAM 503 is divided by the number of the slot machines 10 in which winning has occurred, and a payout of the resultant value is offered in each of the slot machines 10. Further, when winning has occurred in a single slot machine 10, a payout of the deposit value U stored in the RAM 503 is offered therein.

The CPU 501 clears the cumulative value S, the carry-over value R and the deposit value U stored in the RAM 503 (step S507)

The CPU 501 displays an image indicative of the result to the common image display 2 (step S508). FIG. 24C and FIG. 24D illustrate exemplary images indicative of results which are displayed to the common image display 2.

FIG. 24C is a view illustrating an exemplary display screen displayed to the common image display.

In FIG. 24C, there is displayed a winning image 317 indicating that there is a slot machine 10 in which winning has occurred.

FIG. 24D is a view illustrating an exemplary display screen displayed to the common image display.

In FIG. 24D, there is displayed a losing image 318 indicating that there is no slot machine 10 in which winning has occurred.

As a result of the processing in step S508, the result of the common game is displayed to the common image display 2, as illustrated in FIG. 24C and FIG. 24D.

Returning to FIG. 23B, the CPU 501 clears the cumulative number T of games stored in the RAM 503 (step S509). The CPU 501 transmits a common-game end signal to each slot machine 10 (step S510).

As described above, according to the gaming system 1 relating to the present embodiment, the plurality of slot machines 10, the control device 200, and the common image display 2 constitute a single module. This eliminates the necessity of connection of the plurality of slot machines 10 to the control device 200 through a network, installation of the common image display 2 on a wall, works for preventing the network wirings from being exposed to cause disfigurement, and the like, and also eliminates the necessity of works in changing the installation and the layout. Further, since the gaming system 1 can be installed even at a place having no walls in the vicinity thereof and a place having a high ceiling, the restriction on the installation place of the gaming system 1 is eliminated.

Further, since there is no need for installing the common image display 2 on a wall, the change of wall colors due to heat generated from the common image display 2 is suppressed.

The upper end of the common image display panel 310 is mounted on the upper end of the front surface of the common-image-display cabinet 2*a*, via the hinge 314. The holding bars 316 provided near the ends of the upper surface of the bottom portion of the common-image-display cabinet 2*a* hold the common image display panel 310 at a state where the common image display panel 310 is at rest after being rotated upwardly with respect to the floor surface with the hinge 314 as a shaft. This enables performing maintenance of the common image display 2 in front of the common image display 2, thereby facilitating maintenance of the common image display 2.

While, in the present embodiment, there has been described a case where the CPU fan 308 is provided within the CPU housing member 307, only the CPU fan may be provided without the CPU housing member provided, in the present invention.

While, in the present embodiment, there has been described a case where the gaming machines are the slot machines 10, the gaming machines in the present invention are not particularly limited so long as they are gaming machines capable of executing independent games; for example, the gaming machines may be card game machines.

While, in the present embodiment, there has been described a case where the number of gaming machines is 3, the number of gaming machines in the present invention is not particularly limited so long as it is more than one; for example, the number of gaming machines may be 5.

While, in the present embodiment, there has been described a case where the common game is a card game, the common game in the present invention is not particularly limited so long as they are games which are simultaneously executed in all the gaming machines connected through communication cables; for example, the common games may be horse race games.

While, in the present embodiment, there has been described a case where the main CPU 41 included in each slot machine 10 executes normal games, a processor included in the control device may execute normal games in the respective gaming machines connected through the communication cables. With this structure, when the processor has determined to execute a common game, the processor determines whether or not normal games in execution have ended in the respective gaming machines. When the processor determines that normal games in execution have ended in the gaming machines, the processor cancels start of new normal games in these gaming machines. When the processor determines that normal games in execution have ended in all the gaming machines connected through the communication cables, the processor executes a common game in all the gaming machines connected through the communication cables. In the case of this structure, the processor may be constituted by a plurality of CPUs.

While, in the present embodiment, there has been described a case where symbols rearranged in the display blocks 150 are all scatter symbols, the symbols in the present invention are not limited to scatter symbols. For example, a pay line may be provided and a prize may be established or a point value may be offered, when a certain combination of a plurality of symbols is rearranged along the pay line. Also, for example, symbols which cause winning based on the pay line may be combined with scatter symbols.

While, in the present embodiment, there has been described a case where the slot machines 10 are video slot machines, the gaming machines in the present invention may be mechanical slot machines provided with reels.

Although the present invention has been described with reference to embodiments thereof, these embodiments merely illustrate specific examples, not restrict the present invention. The specific structures of respective means and the like can be designed and changed as required. Furthermore, there have been merely described most preferable effects of the present invention, as the effects of the present invention, in the embodiments of the present invention. The effects of the present invention are not limited to those described in the embodiments of the present invention.

Further, in the aforementioned detailed description, characteristic portions have been mainly described, for ease of understanding the present invention. The present invention is not limited to the embodiments described in the aforementioned detailed description, but can be also applied to other embodiments over a wider range of applications. Further, the terms and phrases used in the present specification have been used for clearly describing the present invention, not for limiting the interpretation of the present invention. Further, those skilled in the art will easily conceive other structures, systems, methods and the like which are included in the concept of the present invention, from the concept of the present invention described in the present specification. Accordingly, the description of the claims is intended to include equivalent structures that fall within the technical scope of the invention. Further, the abstract aims at enabling engineers and the like who belong to the present technical field but are not familiar with the patent office and public institutions, the patent, law terms and technical terms to immediately understand the technical content and the essence of the present application through brief studies. Accordingly, the abstract is not intended to restrict the scope of the invention which should be evaluated from the description of the claims. It is desirable that literatures and the like which have been already disclosed are sufficiently studied and understood, in order to sufficiently understand the objects of the present invention and the specific effects of the present invention.

In the aforementioned detailed description, there has been described processing to be executed by computers. The aforementioned description and expressions have been described for the sake of enabling those skilled in the art to understand the present invention most effectively. In the present specification, each step for deriving a single result should be understood to be self-consistent processing. Further, each step includes transmission, reception, recording and the like of electric or magnetic signals. Although, in the processing at each step, such signals have been expressed as bits, values, symbols, characters, terms, numerical characters and the like, it should be noticed that they have been merely used for convenience of description. Further, although the processing at each step was described using expressions common to human behaviors in some cases, the processes described in the present specification are to be executed by various types of devices, in principle. Further, other structures required for conducting each step will be apparent from the aforementioned description.

What is claimed as new and desired to be secured by Letters Patent of the United States is:

1. A gaming system comprising:

a plurality of gaming machines, each including an image display provided with a flat display panel portion therein and an input device for input and being capable of executing an independent game;

a control device;

a single pedestal including a housing space that houses said control device therein, a bottom surface portion for installing the pedestal on a floor surface, and an installation surface for installing said plurality of gaming machines at positions facing to said bottom surface portion;

a supporting member that is provided such that a first end of the supporting member is supported by said pedestal and a second end of the supporting member is oriented upwardly;

a common image display configured to display a common game executed commonly in the plurality of gaming machines, the common image display having a common-image-display cabinet provided with an opening over substantially the entire front surface thereof, and a common flat display panel portion that is provided in said opening and has a size larger than that of said flat display panel portion, having an upper end of said common flat display panel portion mounted on an upper end of a front surface of said common- image-display cabinet via a hinge, being supported at a position above the upper surfaces of said gaming machines by said second end side of said supporting member, and being controlled by said control device; and communication cables for communication between said plurality of gaming machines and said control device.

2. The gaming system according to claim 1, wherein said common-image-display cabinet comprises a holding bar that is provided rotatably in a forward direction of said common-image-display cabinet, with a first end of said holding bar as the center, in such a way that said holding bar projects forward from said common-image-display cabinet, and said common flat display panel portion is provided, in the back surface thereof, with an engagement depressed portion with which a second end of said holding bar is engaged, so that said common flat display panel portion is held at rest after being rotated upwardly or downwardly with respect to the floor surface with said hinge as a shaft.

3. The gaming system comprising:

a plurality of gaming machines, each including an image display provided with a flat display panel portion therein and an input device for input and being capable of executing an independent game;

a control device;

a single pedestal including a housing space that houses said control device therein, a bottom surface portion for installing the pedestal on a floor surface, and an installation surface for installing said plurality of gaming machines at positions facing to said bottom surface portion;

a supporting member that is provided such that a first end of the supporting member is supported by said pedestal and a second end of the supporting member is oriented upwardly;

a common image display having a common-image-display cabinet provided with an opening over substantially the entire front surface thereof, and a common flat display panel portion that is provided in said opening and has a size larger than that of said flat display panel portion, having an upper end of said common flat display panel portion mounted on an upper end of a front surface of said common-image-display cabinet via said hinge, being supported at a position above the upper surfaces of said gaming machines by said second end side of said supporting member, and being controlled by said control device; and communication cables for communication between said plurality of gaming machines and said control device, wherein said control device comprises a processor, and said processor is programmed to execute the processing of (A) executing a normal game in the respective gaming machines connected through said communication cables, (B) determining whether or not to execute a common game which is simultaneously executed in all the gaming machines connected through said communication cables, (C) determining for each of the gaming machines whether or not a normal game in execution has ended, when determining in said processing (B) that a common game is to be executed, (D) canceling, when determining in said processing (C) that the normal game in execution has ended in any of the gaming machines, start of a new normal game in this gaming machine, (E) determining whether or not the normal game in execution has ended in all the gaming machines connected through said communication cables, (F) executing a common game in all the gaming machines connected through said communication cables, when determining in said processing (E) that the normal game in execution has ended in all the gaming machines, and (G) displaying to said common image display a result of the common game executed in said processing (F).

4. The gaming system comprising:

a plurality of gaming machines, each including an image display provided with a flat display panel portion therein and an input device for input and being capable of executing an independent game;

a control device;

a single pedestal including a housing space that houses said control device therein, a bottom surface portion for installing the pedestal on a floor surface, and an installation surface for installing said plurality of gaming machines at positions facing to said bottom surface portion;

a supporting member that is provided such that a first end of the supporting member is supported by said pedestal and a second end of the supporting member is oriented upwardly;

a common image display having a common-image-display cabinet provided with an opening over substantially the entire front surface thereof, and a common flat display panel portion that is provided in said opening and has a size larger than that of said flat display panel portion, having an upper end of said common flat display panel portion mounted on an upper end of a front surface of said common-image-display cabinet via said hinge, being supported at a position above the upper surfaces of said gaming machines by said second end side of said supporting member, and being controlled by said control device; and communication cables for communication between said plurality of gaming machines and said control device, wherein each of said gaming machines comprises a controller, and said control device includes a processor, said controller programmed to execute the processing of (a) executing a normal game, said processor programmed to execute the processing of (A) determining whether or not to execute a common game which is simultaneously executed in all the gaming machines connected through said communication cables, and (B) transmitting a game cancel signal to all the gaming machines connected through said communication cables, when determining in said processing (A) that a common game is to be executed, said controller programmed to execute the processing of (b) determining whether or not the game cancel signal has been received from said control device through said communication cable, (c) canceling start of anew normal game, when determining in said processing (b) that the game cancel signal has been received, and (d) transmitting a normal-game-ended signal to said control device through said communication cable, after having executed said processing (c), said processor programmed to execute the processing of (C) determining through said communication cables whether or not said normal- game-ended signal has been received from all the gaming machines connected through the communication cables, (D) executing a common game when determining in said processing (C) that said normal-game-ended signal has been received, and (E) displaying to said common image display a result of the common game executed in said processing (D).

* * * * *